(12) United States Patent
Flatow

(10) Patent No.: US 11,463,248 B2
(45) Date of Patent: Oct. 4, 2022

(54) MANAGEMENT SYSTEM

(71) Applicant: Munia Limited, Port Vila (VU)

(72) Inventor: Wolfgang Flatow, Conondale (AU)

(73) Assignee: Munia Limited, Port Vila (VU)

( * ) Notice: Subject to any disclaimer, the term of this patent is extended or adjusted under 35 U.S.C. 154(b) by 0 days.

(21) Appl. No.: 17/272,836

(22) PCT Filed: Sep. 2, 2019

(86) PCT No.: PCT/AU2019/050928
§ 371 (c)(1),
(2) Date: Mar. 2, 2021

(87) PCT Pub. No.: WO2020/047582
PCT Pub. Date: Mar. 12, 2020

(65) Prior Publication Data
US 2021/0218565 A1 Jul. 15, 2021

(30) Foreign Application Priority Data
Sep. 3, 2018 (AU) .................................. 2018903240

(51) Int. Cl.
H04L 9/08 (2006.01)
H04L 9/28 (2006.01)
H04L 9/32 (2006.01)

(52) U.S. Cl.
CPC .......... *H04L 9/0869* (2013.01); *H04L 9/0825* (2013.01); *H04L 9/0863* (2013.01); *H04L 9/0866* (2013.01); *H04L 9/3228* (2013.01)

(58) Field of Classification Search
CPC ... H04L 9/0869; H04L 9/0825; H04L 9/0863; H04L 9/0866; H04L 9/3228;
(Continued)

(56) References Cited

U.S. PATENT DOCUMENTS

2007/0101137 A1 5/2007 Lambert
2015/0309921 A1* 10/2015 Smith .................... G06Q 10/06
717/131
2018/0139043 A1 5/2018 Jayachandran et al.

FOREIGN PATENT DOCUMENTS

CN 106575294 B * 1/2020 ............. G06F 16/00
DE 102004006570 B4 6/2007
WO 2020-047582 A1 3/2020

OTHER PUBLICATIONS

Supplementary European Search Report for EP 19857686 dated Mar. 31, 2022, all pages.

(Continued)

*Primary Examiner* — Izunna Okeke
(74) *Attorney, Agent, or Firm* — Kilpatrick Townsend & Stockton LLP

(57) ABSTRACT

A system for tracking an asset including one or more processing devices that identify a spatial region in a complex number space, the spatial region being associated with the asset, receive a user defined password, identify a plurality of key locations within the spatial region at least in part using the user defined password, calculate key numerical values at each of the plurality of key locations using a defined complex number formula and use the key numerical values to generate an encryption key. The asset can be associated with a user by storing an asset record in a database which is indicative of an asset identifier, the spatial region and an encrypted payload derived using the encryption key.

19 Claims, 16 Drawing Sheets

(58) Field of Classification Search
CPC ... H04L 9/0662; H04L 9/0872; H04L 9/0891; H04L 9/3247; H04L 9/0861; H04L 2209/38; G06F 21/602; G06F 21/62; G06F 21/64
See application file for complete search history.

(56) References Cited

OTHER PUBLICATIONS

International Search Report and Written Opinion dated Nov. 15, 2019 in International Patent Application No. PCT/AU2019/050928, filed Sep. 2, 2019, 9 pages.
Alia, M.A., et al., "A New Public-Key Cryptosystem Based on Mandelbrot and Julia Fractal Sets", Asian Journal of Information Technology, vol. 6, Issue 5, Year 2007, p. 567-575.

* cited by examiner

```xml
<Base  N="79"  ID="00000FFFFFF4E0000000000000200300" X="-1.81" Y="0.02" Z="3" P="6825588" I="11" M
    <Asset  Type="Element" SC="1" Number="79" Icon="Gold" Name="Gold - Available Refined" AtomicW
        <Volume note="Defines total above ground mined and refined." Unit="ton" Mapping="AreaToW
            <Units Name="Weight">
                <Unit ID="1" Name="Centigram" units="1" Z="9" note="10 Milligrams = 1 Centigram"/>
                <Unit ID="2" Name="Gram" units="1" Z="8" note="Base Unit."/>
                <Unit ID="3" Name="Ounce" units="28" Z="8" note="Ounce = 28.3595 grams"/>
                <Unit ID="4" Name="Hectogram" units="1" Z="7" note="100 Grams"/>
                <Unit ID="5" Name="Kilo" units="10" Z="7" note="10 Hectograms = 1 Kilo"/>
                <Unit ID="6" Name="Metric Ton" units="1" Z="6" note="Metric ton"/>
            </Units>
    </Asset>
    <Asset Type="Element" SC="2" Number="79" Icon="Gold" Name="Gold - Below Ground" AtomicWeight
        <Volume note="Defines total below ground mined and refined." Unit="ton" Mapping="AreaToW
            <Units Name="Weight">
                <Unit ID="1" Name="Centigram" units="1" Z="9" note="10 Milligrams = 1 Centigram"/>
                <Unit ID="2" Name="Gram" units="1" Z="8" note="Base Unit. 0.035274 Ounces"/>
                <Unit ID="3" Name="Ounce" units="28" Z="8" note="Ounce = 28.3595 grams"/>
                <Unit ID="4" Name="Hectogram" units="1" Z="7" note="100 Grams"/>
                <Unit ID="5" Name="Kilo" units="10" Z="7" note="10 Hectograms = 1 Kilo"/>
                <Unit ID="6" Name="Metric Ton" units="1" Z="6" note="Metric ton"/>
            </Units>
    </Asset>
<Base/>
```

MANAGEMENT SYSTEM

PRIORITY DOCUMENTS

The present application claims priority from Australian Provisional Application No. 2018903240 titled "MANAGEMENT SYSTEM" as filed on 3 Sep. 2018, the content of which is hereby incorporated by reference in its entirety.

BACKGROUND OF THE INVENTION

The present invention relates to a management system and method, and in one example a system and method for tracking an asset, as well as a system and method for generating an encryption key or unique identifier.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In recent years, blockchain technologies have become popular, with these being used in a wide range of applications, including that of digital currencies, such as Bitcoin, Ethereum, or the like. Whilst not backed by physical assets, such currencies have become popular for a range of reasons, including their peer to peer utility and demand.

Blockchain technologies use a massive encrypted ledger that is maintained by thousands of servers and these ledgers contain every single transaction ever made with that currency. This ledger is then duplicated on thousands of servers and massive computing power and energy is used to maintain them. This provides a high degree of security and redundancy, making it difficult for such currencies to be used fraudulently. However, such technologies suffer from a number of drawbacks.

One drawback, is that blockchain, and in particular crypto currencies rely on a technique called mining to generate the encrypted blocks of data. This involves performing complex calculations in order to generate the data blocks, which is in turn requires high levels of computational power, and hence energy. In this regard, FIG. 11 graph is from a Forbes article titled "Bitcoin's Energy Consumption Can Power An Entire Country", which highlights that "Bitcoin's current estimated annual electricity consumption is 61.4 TWh". Thus, one of the biggest problems with Bitcoin and all other crypto currencies is mining and its associated energy usage, and whilst banks may use a lot more power maintaining their own accounts and delivering their financial services, they are handling far greater amounts of currency.

A further issue with blockchain is that of retaining ownership of digital assets. Currently this is achieved through the use of wallets, which store crypto-currency in an encrypted form to prevent it being accessed via third parties. However, current encryption techniques suffer from a number of drawbacks.

In particular, in order for encryption keys to be sufficient secure, these need to be of a sufficient size that these cannot easily be re-calculated. As encryption techniques often rely on prime numbers, there is significant computation involved in deriving encryption keys that can be used, which adds to the issues of energy usage outlined above.

Additionally, no matter how strong the encryption technique is that it is used, overall the encryption process is only effective if it is possible to retain encryption keys secret. In particular, once an encryption key is known, then this can be used together with the encryption algorithm to decrypt encrypted data and reveal its contents. As keys can be hundreds of bits in length, it is not practical to remember these, and instead techniques are required to store encryption keys to allow access to encrypted data. This is frequently done by encrypting the keys using a key store, which in turn requires a key to access its contents, which is in turn often a less complex password. In the case, of username/password access control, in order to function, one or both of those values must be stored in databases as an encrypted block. While this makes the password much more secure by not being visible as plain text, this has two significant side effects, namely that the key used to encrypt the password is known to the system, by whatever algorithm or key store method, and that the password is actually stored in the system, albeit in an encrypted form.

As a result, the potential for compromise is very high should the key store system be discovered, the entire encrypted content could then be decoded, meaning the encryption key storage process is typically the weakest link in any encryption scheme, and improved systems would be desirable.

It will be appreciated that whilst the above described issues are applicable to the field of crypto currencies, they also apply more broadly to other fields, including any fields and systems where encryption or asset management is involved.

In broader fields of asset management, there are also additional issues. For example, asset management typically involves storing information regarding an asset, whether physical or digital, in a database. For example, titles to property assets are typically held by physical possession, paper title, or as a database record, whilst most real-estate titles are managed by databases. Similarly, most precious metal holdings in held central vaults are allocated, traded and managed with databases, whilst non-cash currencies are managed in Bank Account databases, and asset and stock holdings by companies are held in company databases.

In all of these cases, the integrity of database asset storage depends on database integrity, security, software integrity, disaster recovery capability and many more infrastructure and management elements. At a fundamental level the assets integrity depends on database relationships linking an account with an asset, relationships that use completely arbitrary identifiers that vary between every single database in every single organisation. If these identifiers are compromised that relationship is broken, meaning the connection between asset and owner is lost.

As assets become traded more broadly, particularly through techniques such as blockchain, the ability to generate and use globally unique identifiers becomes more pressing.

It can therefore be seen that asset management and other fields require improved systems for generating and tracking unique identifiers, and managing encryption keys, and that these issues also extend to a wide range of other fields.

SUMMARY OF THE PRESENT INVENTION

In one broad form an aspect of the present invention seeks to provide a system for tracking an asset, the system including one or more processing devices configured to: identify a spatial region in a complex number space, the spatial region being associated with the asset; receive a user defined password; identify a plurality of key locations within the spatial region at least in part using the user defined password; calculate key numerical values at each of the plurality of key locations using a defined complex number formula; and, use the key numerical values to generate an encryption key, and wherein the asset is associated with the user by storing an asset record in a database, the asset record being indicative of: an asset identifier; the spatial region; and, an encrypted payload derived using the encryption key.

In one embodiment the one or more processing devices are configured to identify the plurality of key locations using a sequence of geometric translations based on the user defined password.

In one embodiment the one or more processing devices are configured to determine the sequence of geometric translations using fixed translations modified using the user password.

In one embodiment the one or more processing devices are configured to: concatenate the repeated versions of the password to generate a character string of a defined length; and, apply each character in the character string to a respective fixed translation to generate the sequence of geometric translations.

In one embodiment the one or more processing devices are configured to: concatenate the repeated versions of the password to generate a character string; and, truncate the character string at the defined length.

In one embodiment the fixed translations are angles and wherein the one or more processing devices are configured to: define lengths using the characters; and, generate geometric translations in the form of translation vectors using the angles.

In one embodiment the angles represent a rotation angle about a key origin location in the spatial region and the lengths represent a distance from the key origin location.

In one embodiment the key origin location is at least one of: a central location within the spatial region; a corner of the spatial region; offset from a central location within the spatial region; and, offset from a corner of the spatial region.

In one embodiment the one or more processing devices are configured to generate the lengths using ASCII values of each character.

In one embodiment the fixed translations are at least one of: predefined; generated for each asset; and, unique to each asset.

In one embodiment the one or more processing devices are configured to generate fixed translations for each asset by: selecting a seed location within the spatial region; calculating a seed numerical value at the seed location using the defined complex number formula; and, using the seed numerical value to seed a number generator to thereby create a plurality of generated values, the fixed translations being derived from the plurality of generated values.

In one embodiment the number generator is a random number generator, and wherein the plurality of generated values are identical for a given seed numerical value.

In one embodiment the seed location is at least one of: a key origin location; a central location within the spatial region; a corner of the spatial region; offset from a central location within the spatial region; and, offset from a corner of the spatial region.

In one embodiment the one or more processing devices are configured to generate the numerical value at each key location by: using an iteration of the complex number formula; generating an integer value from the result of the complex number formula iteration; and, calculating a modulus 256 number from the integer value.

In one embodiment the one or more processing devices are configured to: identify a first plurality of key locations within the spatial region using a sequence of geometric translations calculated using first fixed translations modified using the user defined password; identify a second plurality of key locations within the spatial region using a sequence of geometric translations calculated using second fixed translations modified using the user defined password; calculate key numerical values at each of the first and second plurality of key locations; and, use the key numerical values to define an encryption key.

In one embodiment the one or more processing devices are configured to: identify an unallocated spatial region in the complex number space; and, allocate the unallocated spatial region to the asset to associate the spatial region with the asset.

In one embodiment one or more processing devices are configured to: determine an asset type; and, selected the unallocated spatial region in accordance with the asset type.

In one embodiment the one or more processing devices are configured to determine an extent or depth of the spatial region based on at least one of: a property of the asset; a value of an asset; and, a quantity of an asset.

In one embodiment the one or more processing devices are configured to: generate a unique asset identifier; and, generate asset data using the unique asset identifier.

In one embodiment the one or more processing devices are configured to associate the spatial region with the asset by recording an association between the unique asset identifier and the asset.

In one embodiment the one or more processing devices are configured to calculate the asset identifier using at least one of: coordinates of the spatial region in the complex space; and, an extent of the spatial region in the complex space.

In one embodiment the one or more processing devices are configured to: calculate identifier numerical values associated with the spatial region using a defined complex number formula; and, generate a unique asset identifier using the identifier numerical values.

In one embodiment the one or more processing devices are configured to: identify a plurality of identifier locations within the spatial region; and, calculate the identifier numerical values at each of the plurality of identifier locations using a defined complex number formula.

In one embodiment the unique asset identifier is a 512 bit number represented by 32 hexadecimal characters.

In one embodiment the one or more processing devices are configured to: generate a digital signature; and, generate the asset data using the digital signature.

In one embodiment the one or more processing devices are configured to generate the digital signature using a private key of a private/public key pair to allow the digital signature to be verified.

In one embodiment the one or more processing devices are configured to generate the digital signature using the unique asset identifier.

In one embodiment the one or more processing devices are configured to transfer an asset from a first user to a second user by: receiving a first user defined password from the first user; using the first user defined password to generate a first encryption key; decrypting the payload using the first encryption key to generate a decrypted payload; receiving a second user defined password from the second user; updating the payload to link to the second users wallet;

using the second user defined password to generate a second encryption key; encrypting the decrypted payload using the second encryption key to generate the new payload; and updating the asset data using the new payload.

In one embodiment the one or more processing devices are configured to transfer an asset from a first user to a second user by: generating a temporary password; use the temporary password to generate a temporary encryption key; encrypt the decrypted payload using the temporary encryption key to generate the new payload; update the asset data using the new payload; notify the second user of the temporary password; receiving the temporary password from the second user; using the temporary password to generate the temporary encryption key; decrypting the payload using the temporary encryption key to generate a decrypted payload; receiving a second user defined password from the second user; using the second user defined password to generate a second encryption key; encrypting the decrypted payload using the second encryption key to generate the new payload; and updating the asset data using the new payload.

In one embodiment the database includes a number of wallets associated with respective users, and wherein an asset is associated with an asset owner by storing the asset data in the wallet of the respective asset owner.

In one embodiment each wallet is an asset and is associated with a respective spatial region in the complex number space, and wherein asset data for assets associated with the wallet are stored as part of a wallet payload.

In one embodiment the database includes a number of wallets associated with respective users, and wherein an asset is associated with an asset owner by linking the asset data to the wallet of the respective asset owner.

In one embodiment the asset data is stored in an asset data store and wherein the asset data includes a wallet identifier of a wallet to which the asset is linked.

In one embodiment the one or more processing devices are configured to generate a graphical representation of the spatial region, and wherein the graphical representation can be used to identify the spatial region.

In one embodiment at least one of the asset data and the payload are indicative of at least one of: a spatial region location; a spatial region extent; a graphical representation of the spatial region; a time stamp; an asset location; an asset identity; an asset value; at least one asset owner; a digital signature; and, a wallet identifier.

In one embodiment the spatial region includes at least one of: a spatial area; and, a spatial volume.

In one embodiment the spatial region is identified using at least one of: a vector indicative of a location of the spatial region in the complex space; and, a parameter indicative of an extent of the spatial region.

In one embodiment the complex formula is at least one of: a Julia set; a Mandlebrot set; a complex number set; and, a chaotic formula using two seed values.

In one embodiment the spatial region is provided in a part of complex space where the complex formula has non-infinite values and complexity is non-zero.

In one embodiment the system is configured to track assets in multiple asset classes, and wherein: each asset class is assigned to a respective asset region in the complex number space; and, each asset within an asset class is associated with a spatial region that is a part of the asset region associated with the asset class.

In one embodiment a size of the spatial region is based on at least one of: a value of the asset; a quantity of the asset; and, a size of the asset.

In one embodiment at least some of the asset classes correspond to physical assets.

In one embodiment the physical assets correspond to at least one of: gold; silver; platinum; diamonds; and, oil.

In one embodiment the one or more processing devices are configured to generate an asset representation, the asset representation including at least a graphical representation of the spatial region.

In one embodiment the asset representation is indicative of at least one of: the spatial region; the asset identifier; an asset class; an asset value; an asset size; and, an asset quantity.

In one embodiment at least one of the asset representation and the graphical representation is subject to copyright.

In one embodiment an asset representation is tradable.

In one broad form an aspect of the present invention seeks to provide a method for tracking an asset, the method including, in one or more processing devices: identifying a spatial region in a complex number space, the spatial region being associated with the asset; receiving a user defined password; identifying a plurality of key locations within the spatial region at least in part using the user defined password; calculating key numerical values at each of the plurality of key locations using a defined complex number formula; and, using the key numerical values to generate an encryption key, and wherein the asset is associated with the user by storing an asset record in a database, the asset record being indicative of: an asset identifier; the spatial region; and, an encrypted payload derived using the encryption key.

In one broad form an aspect of the present invention seeks to provide a computer program product for tracking an asset, the computer program product including computer executable code which when executed using one or more suitably programmed processing devices causes the one or more processing devices to: identify a spatial region in a complex number space, the spatial region being associated with the asset; receive a user defined password; identify a plurality of key locations within the spatial region at least in part using the user defined password; calculate key numerical values at each of the plurality of key locations using a defined complex number formula; and, use the key numerical values to generate an encryption key, and wherein the asset is associated with the user by storing an asset record in a database, the asset record being indicative of: an asset identifier; the spatial region; and, an encrypted payload derived by using the encryption key.

In one broad form an aspect of the present invention seeks to provide a system for generating an encryption key, the system including one or more processing devices configured to: identify a spatial region in a complex number space; receive a user defined password; identify a plurality of key locations within the spatial region at least in part using the user defined password; calculate key numerical values at each of the plurality of key locations using a defined complex number formula; and, use the key numerical values to generate an encryption key.

In one broad form an aspect of the present invention seeks to provide a method for generating an encryption key, the method including, in one or more processing devices: identifying a spatial region in a complex number space; receiving a user defined password; identifying a plurality of key locations within the spatial region at least in part using the user defined password; calculating key numerical values at each of the plurality of key locations using a defined complex number formula; and, using the key numerical values to generate an encryption key.

In one broad form an aspect of the present invention seeks to provide a computer program product for generating an encryption key, the computer program product including computer executable code which when executed using one or more suitably programmed processing devices causes the one or more processing devices to: identify a spatial region in a complex number space; receive a user defined password; identify a plurality of key locations within the spatial region at least in part using the user defined password; calculate key numerical values at each of the plurality of key locations using a defined complex number formula; and, use the key numerical values to generate an encryption key.

In one broad form an aspect of the present invention seeks to provide a system for generating a unique identifier, the system including one or more processing devices configured to: identify a spatial region in a complex number space; determine identifier numerical values associated with the spatial region; generate a unique identifier using the identifier numerical values.

In one broad form an aspect of the present invention seeks to provide a method for generating a unique identifier, the method including one or more processing devices that: identifying a spatial region in a complex number space; determining identifier numerical values associated with the spatial region; generating a unique identifier using the identifier numerical values.

In one broad form an aspect of the present invention seeks to provide a computer program product for generating a unique identifier, the computer program product including computer executable code which when executed using one or more suitably programmed processing devices causes the one or more processing devices to: identify a spatial region in a complex number space; determine identifier numerical values associated with the spatial region; generate a unique identifier using the identifier numerical values.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which: —

FIG. 12 is an XML snippet defining the Gold Base for the prototype.

DETAILED DESCRIPTION OF THE PREFERRED EMBODIMENTS

Figure 1A:
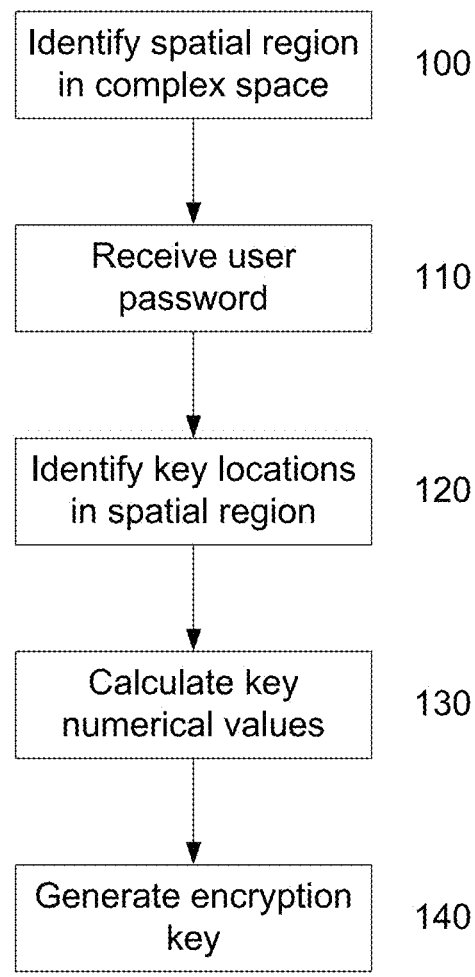
FIG. 1A is a flow chart of an example of a process for generating an encryption key.

An example of processes for generating an encryption key and a unique identifier will now be described with reference to FIGS. 1A and 1B, respectively.

For the purpose of illustration, it is assumed that these processes are performed at least in part using one or more electronic processing devices forming part of one or more processing systems, such as computer systems, servers, or the like, which may optionally be connected to one or more client devices, such as mobile phones, portable computers, tablets, or the like, via a network architecture, as will be described in more detail below. For ease of illustration the remaining description will refer to a processing device, but it will be appreciated that multiple processing devices could be used, with processing distributed between the devices as needed, and that reference to the singular encompasses the plural arrangement and vice versa.

For generating an encryption key, at step 100, a spatial region is identified in a complex number space. The complex number space can be populated with values derived utilising a complex number formula, and in one particular example chaotic complex number formula, such as those used to generate fractal sets, including Julia or Mandelbrot sets. This results in a complex number space populated with numerical values, with the values being derived based on iterations of the formula. Such complex fractal sets are well known in the art and thus will not be described in further detail. It will be noted that in order for the techniques to operate the complex space does not actually need to be populated and numerical values can be calculated on demand, as will be described in more detail below.

The spatial region could be of any appropriate form and could include an area within the complex space. In this regard, complex space typically include two dimensions in the form of axes, corresponding to real and imaginary parts of the complex numbers. However, it will also be appreciated that a third dimension in the form of depth can be provided corresponding to a depth of iteration of the complex number formula, which will result in further numerical values. Accordingly, whilst the spatial region could be an area, more typically the spatial region is a volume including an area and depth.

The spatial region could be identified in any appropriate manner. For example, if the spatial region has been previously defined, this could include receiving details of the spatial region from a third party, for example in the form of coordinates of the spatial region within the complex space, or could involve retrieving details from a database or other suitable data store. Alternatively, if the spatial region has not been previously characterised, this could involve a discovery process to identify a region of the complex space that is not currently utilised and is of sufficient complexity.

At step 110, a user password is received. The user password could be of any appropriate form, but is typically in the form of a string of alphanumeric characters. Whilst the password could be received using any technique, typically the password is based on user input commands, provided via a user interface and/or received from a client device, thereby avoiding the issues associated with the password being stored.

At step 120, key locations are identified in the spatial region. The term "key locations" refers to locations within or mapped to the spatial region that are used to generate a key and this terminology is used to distinguish from "identifier locations", discussed in more detail below. The key locations can be determined in any appropriate manner, but this is typically performed at least in part utilising the user defined password. In one particular example, this is achieved utilising a series of translations within or mapped to the spatial region, which are derived based on the user defined password, such that the sequence of translations is unique for any given password.

At step 130, key numerical values are calculated, with a respective value being calculated for each of the key locations using the complex number formula. Thus, the complex number formula is executed in order to derive a numerical value at each of the key locations identified at step 120. In this regard, it will be appreciated that the execution of the formula could occur once the key locations have been identified, meaning it is not necessary to pre-calculate numerical values for the complex space. However, this is not essential and alternatively, pre-calculated numerical values could simply be retrieved as needed.

At step 140, the key numerical values are utilised in order to generate an encryption key. This can be achieved in any manner, but typically involves concatenating the key numerical values, to generate an encryption key having a desired length.

In one example, once generated the encryption key can be used together with an encryption algorithm to all data to be encrypted and/or decrypted. It will be appreciated that any suitable encryption algorithm could be used and examples include AES, blowfish, twofish, or the like, although it will be appreciated that these examples are not intended to be limiting.

Accordingly, the above described process allows for the calculation of complex encryption keys utilising a significantly simplified computational technique. In particular, the system operates to generate a unique encryption key by relying on the fact that the complex space has significant complexity by virtue of the complex number formula used to generate numerical values throughout the space. The formula results in a large degree of variation in numerical value between locations within the complex number space. Whilst not random, such numbers are nonetheless complex to derive without information regarding the key locations.

Furthermore, the key locations are derived from a unique user defined password, meaning that as long as the password is kept secret, it is not possible for third parties to derive these numerical values and reconstruct the encryption key.

Nonetheless, by virtue of the fact that each encryption key can be generated based on a unique spatial region, this in effect precludes duplication of encryption keys, relying on differences in both user defined password and the numerical values throughout different spatial regions in order to generate a unique encryption key. In other words, the same password associated with different spatial regions will generate different encryption keys.

Despite this, the encryption key is deterministic in the sense that it can be computed based on knowledge of the spatial region location within the complex number space and the user defined password. As a result, as long as the user defined password and spatial region are known, the encryption key can be calculated, whilst key security is maintained as long as the password and/or spatial region are kept secret. As the spatial region location can be easily defined based for example on a three-dimensional coordinate vector, this provides a mechanism that allows encryption keys to be easily calculated from easily remembered information, in the form of the coordinate and/or password, whilst making the encryption keys virtually impossible to reverse engineer or otherwise derive.

This therefore obviates the problems associated with traditional encryption keys, namely the computational expensive process of generating unique keys, and also the difficulty in being able to securely store keys. In particular, the ability to regenerate the key using easily remembered information absolutely avoids the need for the encryption key to ever be stored, thereby largely mitigating the issues associated with key storage.

It will therefore be appreciated that encryption processes performed utilising such approaches can result in vastly superior encryption, avoiding key storage, the weakest link of existing encryption processes, as well as reducing the technical problems associated with encryption key derivation and storage.

In one example, such encryption keys can be used as part of an asset tracking process. An example of this will be described in more detail below, but in essence this is achieved by associating the spatial region with a respective asset. This is achieved by storing an asset record in a database, with the asset record being indicative of an asset identifier, and the spatial region. The asset data further includes a payload, which is derived using the encryption key to encrypt data, such as the asset identifier, spatial region and/or other information. Thus, in this example, the region in complex space can be associated with an asset that has an asset identifier, with the encryption key derived being from spatial region used to create the asset record, which can then be stored in a database. The encryption key is user specific, and in particular is based on a user defined password, and this allows the asset to be effectively secured and owned by the user, as they are the only individual able to generate an encryption key used to decrypt the payload, which can in turn prove ownership of the asset. This approach can be used to track and secure assets of any appropriate form, which could include physical assets tracked by way of an assigned unique asset identifier, or could include virtual assets, such as crypto currencies or the like.

It will be appreciated that the above described process requires the presence of an asset identifier. Asset identifiers could be generated in any particular manner, but in one example, this can again be defined based on the spatial region, and an example of this will now be described with reference to FIG. 1B.

In this example, a spatial region is identified at step 150. Again, this could be achieved in any appropriate manner and could involve performing a discovery operation to identify an unallocated spatial region, or could involve retrieving or otherwise receiving details of a previously allocated spatial region.

At step 160, identifier numerical values are determined and associated with the spatial region. This can be achieved in any appropriate manner, but in one example is performed at least in part using coordinates of the spatial region and/or the extent or depth of the spatial region. In this regard, basing the identifier and/or extent of the spatial region, allows the spatial region to be retrieved from the identifier, whilst also ensuring the identifier is unique. However, numerical values derived from the spatial region using the complex number formula may also be used, for example to increase the length of the identifier, if required.

In any event, having determined identifying numerical values, these can then be used to generate the unique identifier at step 170, for example by concatenating the individual numbers calculated.

In this example, as each asset is assigned a distinct physical location, the resulting identifier is globally unique, whilst allowing the unique identifier to be calculated using straightforward techniques, meaning this is not computationally expensive. Furthermore, by virtue of the unique identifier being related to the spatial region, this can be used to identify the spatial region, which can be further used in asset tracking. For example, by associating a spatial region with an asset, and then creating a unique asset identifier based on the identifier using the above described techniques, this allows the asset to be more easily tracked. Furthermore, even in the event that the identifier is lost, for example as a result of database corruption or similar, the unique identifier can be easily retrieved by recalculating this based on the spatial region with which the asset is associated. Thus the unique identifier is immutable, as it is uniquely associated with the spatial region that is assigned to the asset and exists outside databases as the identifier can be reconstructed based on knowledge of the spatial region.

Figure 1B:
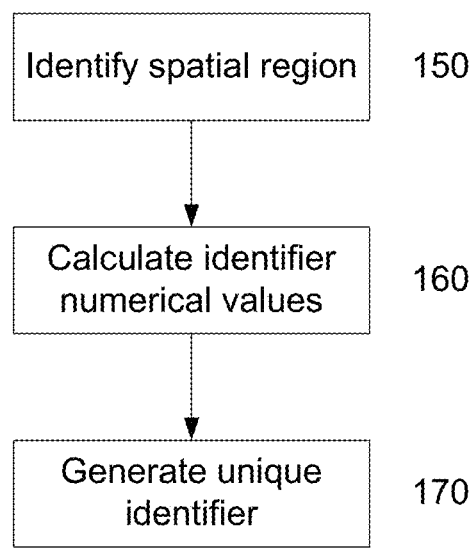
FIG. 1B is a flow chart of an example of a process for generating a unique identifier.

It will further be appreciated from this that the above described techniques can be used in conjunction, in particular forming part of an asset tracking system by using the approach of FIG. 1B in order to generate a unique identifier associated with an asset, and then using the approach of FIG. 1A in order to generate a user specific encryption key associated with the asset. In combination, this allows a secure database entry to be created, which can only be accessed by a user having the user defined password, which in turn can be used to act as a record of ownership of the asset.

A number of further features of such arrangements will now be described.

In one example, the process of identifying the plurality of key locations includes using a sequence of geometric translations based on the user defined password. In particular, the user defined password is utilised to define a number of translations from a fixed point, such as an origin point. The fixed point could be used as the starting point for each translation, or could be an initial starting point, with subsequent locations being calculated based on a translation from a previous key location.

Whilst the user defined password can be used to calculate the sequence of geometric translations in any appropriate manner, in one example this is achieved by concatenating repeated versions of the password to generate a character string of a defined length. Each character in the character string is then applied to a respective fixed translation to generate custom translations, which are then combined to form a unique sequence of geometric translations. Thus, a sequence of fixed translations, which are fixed across the entire system, and can be used for multiple spatial regions, can be used with the password then modifying each fixed translation, in order to generate a unique sequence of geometric translations that are specific to each password.

In this instance, as a user defined password may not be of sufficient length in order to generate a sufficiently long string of characters to derive an encryption key, typically requiring one character for each translation, repeated versions of the password can be concatenated to create a longer string of characters. In the event that the repeated concatenated passwords are too long, the character string can be truncated at a defined length.

The nature of the fixed translations can be of any appropriate form, but in one example are angles from a defined axial direction, such as an x (real) or y (imaginary) axis, with the one or more processing devices operating to define lengths using the characters in the string and then generating geometric translations in the form of translation vectors using the angles and the lengths.

In one example the angles represent a rotation angle about a key origin location, in other words, a defined location in the spatial region and the lengths represent a distance from the key origin location. The key origin location can be any location within the spatial region, but to allow this to be easily identified it is typically a central location within the spatial region or a corner of the spatial region, or is offset from a central location or corner by a predetermined distance and/or direction.

The fixed translations, and in particular the angles, could be predefined, and could be common to all assets. However, to further enhance security the fixed translations, and in particular the angles, could be predefined and/or generated for each asset, and hence are unique to each asset.

In this example, rather than use predefined angles, which need to be stored, in a further example, the angles are calculated at least in part based on the content of the spatial region. To achieve this, the processing device can select a seed location within the spatial region, such as a key origin location and/or a central location within the spatial region or a corner of the spatial region, or offset from the central location or corner, or the like. A seed numerical value is calculated based on the seed location using the defined complex number formula, with the seed numerical value then being used to seed a number generator to thereby create a plurality of generated values. For example, the processing device could seed a random number generator allow a sequence of random numbers to be generated based on the seed value, so that the plurality of generated values are identical for a given seed numerical value, with these being used to derive the fixed translations, and in particular the angles.

Thus, when an encryption key is to be generated, a seed value can be calculated from the seed value of calculated based on a defined seed location in the spatial region. The seed value is used to generate a string of numbers, which are random, but fixed for a given seed number. The random numbers can then be converted to angles, for example using a modulo 360 calculation. This allows the fixed translations and in one example, the angles to be unique for each spatial region and generated based on the spatial region, so that the angle values do not need to be stored, thereby further enhancing security.

Having determined the angles, the processing device can calculated the key locations using the lengths, for example by generating the lengths using an ASCII value of each character in the string derived from the user password, although it will be appreciated that any a suitable approach could be used.

The one or more processing devices typically generate a numerical value at each key location using an iteration of the complex number formula, generating an integer value from the results of the complex number formula iteration and then calculating a modulus 256 number from the integer value. The number of iterations used may be defined as part of the selection of the spatial region, and could be defined as part of a unique identifier, as will be described in more detail below.

A further obfuscation can be achieved by repeating this process using a different sequence of fixed translations, such a different angle array, so that first and second sequences of geometric translations are calculated from the password. Each of these are then used determine respective first and second key locations, with key numerical values being calculated at each of the key locations and then used to define an encryption key.

It will be appreciated that the above described processes are not reversible, and hence are one way, meaning it is not possible to derive a password from an encryption key. This further helps ensure security of the system, meaning that even if a third party is able to intercept an encryption key associated with an asset, they would not be able to recover the password and hence unlock the asset and/or any other asset.

When the above described processes are performed as part of an asset tracking system, it is typical to associate the asset with the spatial region. This process typically involves identifying an unallocated spatial region in the complex number space and then allocating the unallocated spatial region to the asset to associate the spatial region with the asset. This can be achieved by storing an asset entry, which defines the respective spatial region allocated to each asset, together with other required information, such as an identity of the asset, within a database of an asset tracking system.

When assigning the spatial region, this can be performed based on the nature or type of the asset, so for example spatial regions for specific types of asset could be selected from particular parts of the complex space, allowing related assets to be located close to each other within the complex space. In this case, the processing device will typically determine an asset type and then select the unallocated spatial region in accordance with the asset type.

Additionally, the extent of the spatial region and/or depth of the spatial region could be selected based on a property of the asset, such as a value of the asset if the asset has a fixed value, or a size, quantity, weight, volume or amount of the asset. For example, if the asset is a physical resource, the extent of the spatial region could be scaled based on the volume or weight of the resource. This also has the added benefit of allowing assets to be traded and divided, for example allowing spatial regions to be subdivided in order to trade portions of an asset.

It will be appreciated that taking these latter points in combination mean that the location and extent of the spatial region within the complex space can define both the type of the asset and the volume, weight, quantity or value of the asset (depending on the asset type). Furthermore, as the unique asset identifier can be based on the location and extent of the spatial region, as described above with respect to FIG. 1B, this means these values can be derived directly from the unique identifier, so that the unique identifier is not only globally unique, but is also inherently descriptive of the nature and value or quantity of the asset.

It will also be appreciated that the identifier could be partially based on identifier numerical values associated with the spatial region calculated using a defined complex number formula. This could be performed based for example on average values associated with subregion of the spatial region and or by identifying a plurality of identifier locations within the spatial region. This can be used as an alternative to the above technique, or in conjunction with the above technique, for example if additional complexity is required.

Additional techniques can be used in order to help further secure the assets. In one example, the one or more processing devices generate a digital signature and then generate the asset data using the digital signature. The digital signature could be of any appropriate form but typically is generated using a private key of a public/private key pair to allow the digital signature to be verified. For example, the digital signature could be created by signing information such as the unique asset identifier, information regarding spatial region or other numerical values derived from the spatial region using the private key. A public key can then be used to decrypt the signature and in turn recreate the signed information. As the signed information can be directly derived from the knowledge of the spatial region in the complex space, this allows the signature to be verified. It will also be appreciated that other appropriate digital security techniques could be used.

Typically, the unique asset identifier is a 512 bit number represented by 32 hexadecimal characters, although other suitable unique identifiers could be used. Similarly, the encryption key could be a 128, 256, 512, 1024, 2048 bit number, or larger, depending upon the preferred implementation.

Having created assets, it is then possible to transfer assets from one user to another. In one example, transferring an asset from a first user to a second user is achieved by receiving a first user defined password from the first user, using that to generate a first encryption key, which is then used to decrypt the payload of the asset data. A second user defined password is then received from a second user, with this being used to generate a second encryption key, which is then used to encrypt the decrypted payload, and thereby generate a new payload, which is stored as part of the asset data.

As both first and second users may not be present when an asset transfer is to occur, in one example a temporary password could be used to generate a temporary encryption key, which is used to encrypt the decrypted payload, with the temporary password being provided to the second user, allowing the second user to then replace the temporary password with their own user defined password using an approach similar to that described above.

Irrespective of how this is achieved, it will be appreciated that this provides a mechanism to update ownership of the asset, with ownership being reflected by ownership of the password, which can then be used to decrypt and validate the asset data payload.

In one particular example, asset tracking is achieved utilising wallets that are assigned to users, with each user being able to store a number of assets within a given wallet. Thus, each wallet can store asset data associated with one or more assets, allowing the user to easily track which assets they own. As part of this process, each wallet is implemented as an asset and is associated with a respective spatial region in the complex number space in a manner similar to that described above with respect to other assets. This allows each wallet to have a unique wallet identifier, generated based on the respective spatial region, and also a unique encryption key that is based on the spatial region and user password.

In one example, the wallet asset data will include a wallet payload, which can include information regarding each of the assets the individual owns, with this being encrypted using the wallet encryption key, so that assets are encrypted within the wallet. This can be achieved by storing asset data of the asset in the wallet payload. More typically however, details of assets are stored in an assetdatabase, with the asset data including a wallet identifier of a wallet with which the asset is linked. The wallet identifier can be stored in the asset data in unencrypted form, to allow details of assets associated with a wallet to be viewed, but is also typically stored as part of the asset payload, so that the asset can be secured. In particular, this ensures the wallet with which the asset is associated can only be updated by a user having the encryption key for the asset payload. In the event the unencrypted wallet identifier is fraudulently altered this would be detected when the asset payload is next decrypted, allowing the altered wallet identifier to be overwritten.

It will be appreciated that in this instance, when the user wishes to view information regarding their assets, they must enter their own wallet password, allowing the wallet encryption key to be generated and used to decrypt the wallet payload. Asset data for each of the assets can then be viewed, either from the decrypted wallet payload, or by retrieving asset data from the asset database, using the wallet identifier, with the user being able to further interact with assets by entering a user password associated with each of the assets, and thereby decrypt the asset payload, as needed. In this instance, it will be appreciated that the user could utilise the same user defined password for their wallet and the assets stored therein, but as the wallet and assets are associated with different spatial regions, this ensures that the encryption key for the wallet and each of the assets is unique. Nevertheless, the user can also use different passwords, ensuring an additional degree of security in that third parties can only access assets in the event that both the wallet and asset password are known.

In one example, the processing devices generate a graphical representation of the spatial region, allowing this to be used to assist in identifying the spatial region. In particular, the graphical representation can act as a visual signature or seal, which can be viewed by users and easily recognised to help users distinguish different assets. The graphical representation is typically derived based on numerical values from within the spatial region and could be defined at different levels of complexity depending on the intended use. In one example, this could be utilised in a similar manner to a barcode or QR code, allowing a software application to scan this and retrieve the identifier, using this to retrieve information regarding the relevant asset data. In particular, in one example this allows the nature of the asset and the volume, quantity or value of the asset to be determined.

As described above, the asset data can include information which may be stored natively within the asset data and/or in an encrypted manner within the payload. The information can include any one or more of a spatial region location, a spatial region extent, a graphical representation of the spatial region, a time stamp corresponding to a date of creation, an asset location such as a real world location of a physical asset, an asset identity such as an asset name, an asset value, an asset owner such as a name or other identifier associated with an owner, a wallet identifier, a digital signature, or the like. The asset data can also be used to store a record of owners and/or transactions performed using the asset, allowing the assets to function in a manner similar to crypto currencies, or the like.

The spatial region can include any one or more of a spatial area or volume, the spatial region can be identified using a vector indicative of a location of the spatial region in the complex space and/or a parameter indicative of an extent of the spatial region.

The complex formula can be of any appropriate form but typically includes one or more of a Julia set, a Mandelbrot set, a fractal set, or other chaotic formula. Typically, the spatial region is provided in parts of the complex space, where the complex formula has non-infinite values and hence has a non-zero complexity, and in this regard, it will be appreciated that a minimum level of complexity is required in order to ensure that generated identifiers and keys are sufficiently unique.

In one example the system is configured to track assets in multiple asset classes. In this instance, each asset class can be assigned to a respective asset region in the complex number space, with each asset within an asset class is associated with a spatial region that is a part of, and in particular a sub-region of, the asset region associated with the asset class. Thus, an asset region can be defined for an asset class such as gold, with each gold asset being assigned to a spatial region within the gold asset class region.

In one embodiment a size of the spatial region is based on a value of the asset, a quantity of the asset and or a size of the asset. Thus, when the asset classes correspond to physical assets, the size of an asset of the spatial region can represent a quantity and/or size or value of the real physical asset. Examples of physical assets that can be tracked using the system include gold, silver, platinum, diamonds, and oil. However, this is not intended to be limiting and it will be appreciated that any asset could be tracked. For example residential and/or commercial property could be tracked, in which case each asset represents a respective property, whilst FIAT currencies could be tracked, with assets representing a respective denomination of the currency. Similarly, the system could be used to track virtual assets, such as bitcoin, or the like.

To assist with asset tracking and/or trading, the processing device can be configured to generate an asset representation. The asset representation typically includes at least a graphical representation of the spatial region and may also include any one or more of an indication of the spatial region, the asset identifier, an asset class, an asset value, an asset size or an asset quantity.

It will be appreciated that the graphical representation of each spatial region is unique, and needs to be generated. As a result of this the graphical representation, and hence the asset representation are subject to copyright, which in turn makes the asset representation a tradable commodity.

As a result, the asset representations, represent an entirely new class of digital asset that provides a copyrighted foundation for each individual asset. Copyrighted material is a Legal Asset protected by the Berne Convention, and therefore can be legally used to 'pay debts' according to international commercial law.

Figure 2:
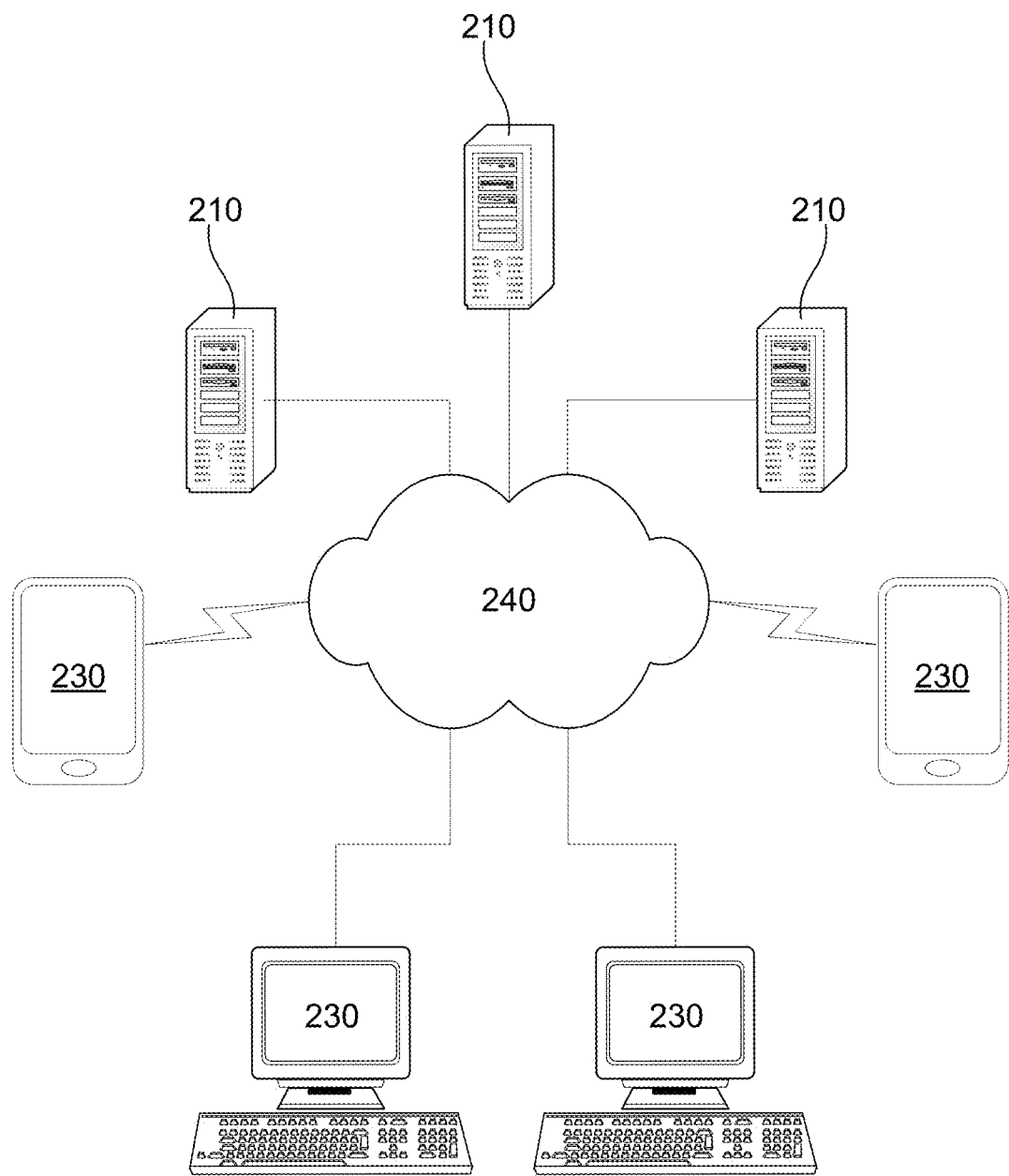
FIG. 2 is a schematic diagram of an example of a distributed computer architecture.

As mentioned above, in one example, the process is performed by one or more processing systems and client devices operating as part of a distributed architecture, an example of which will now be described with reference to FIG. 2.

In this example, a number of processing systems 210 are coupled via communications networks 240, such as the Internet, and/or one or more local area networks (LANs), to a number of client devices 230. It will be appreciated that the configuration of the networks 240 are for the purpose of example only, and in practice the processing systems 210 and client devices 230 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, each processing system 210 is able to perform a search of complex space and identify spatial regions, assign these to assets, and then manage administration of asset tracking, including managing digital wallets and asset transfers. Client devices 230 are able to interact with the processing systems 210 to allow for user interaction with the assets, or the like. Whilst the processing system 210 is shown as a single entity, it will be appreciated that in practice the processing system 210 can be distributed over a number of geographically separate locations, for example by using processing systems 210 and/or databases that are provided as part of a cloud-based environment. It is also feasible for asset data to be stored in a blockchain environment, in which case the processing systems 210 may operate to generate blocks and provide access to the blockchain. However, the above described arrangement is not essential and other suitable configurations could be used.

Figure 3:
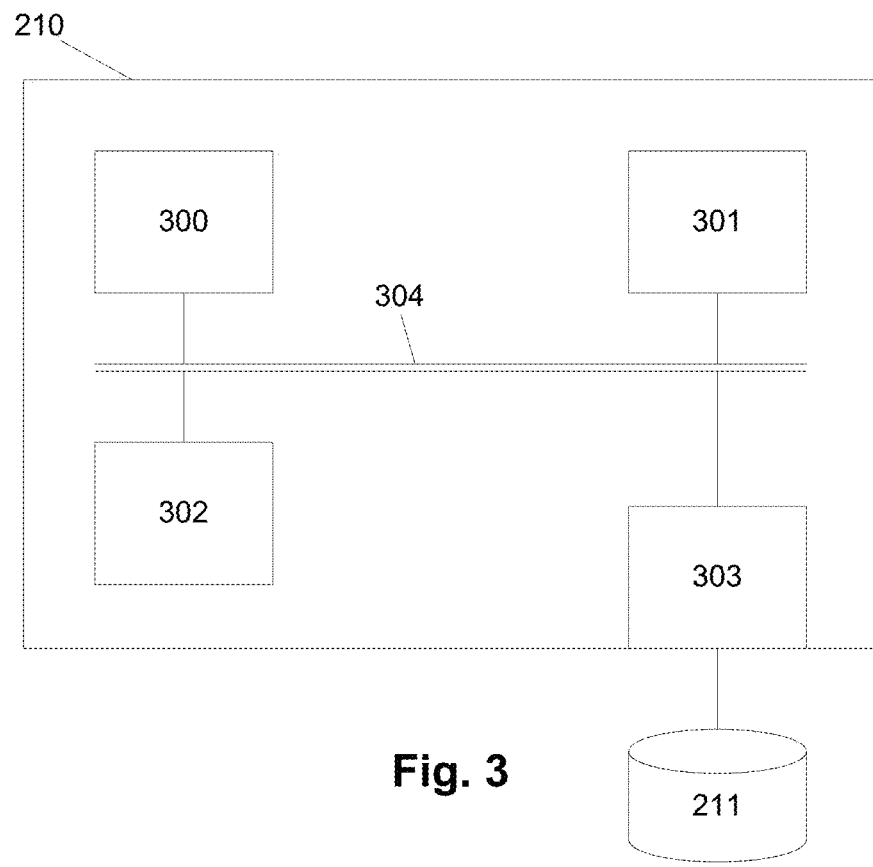
FIG. 3 is a schematic diagram of an example of a processing system.

An example of a suitable processing system 210 is shown in FIG. 3.

In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications network 240, databases, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing system 210 may be formed from any suitable processing system, such as a suitably programmed client device, PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
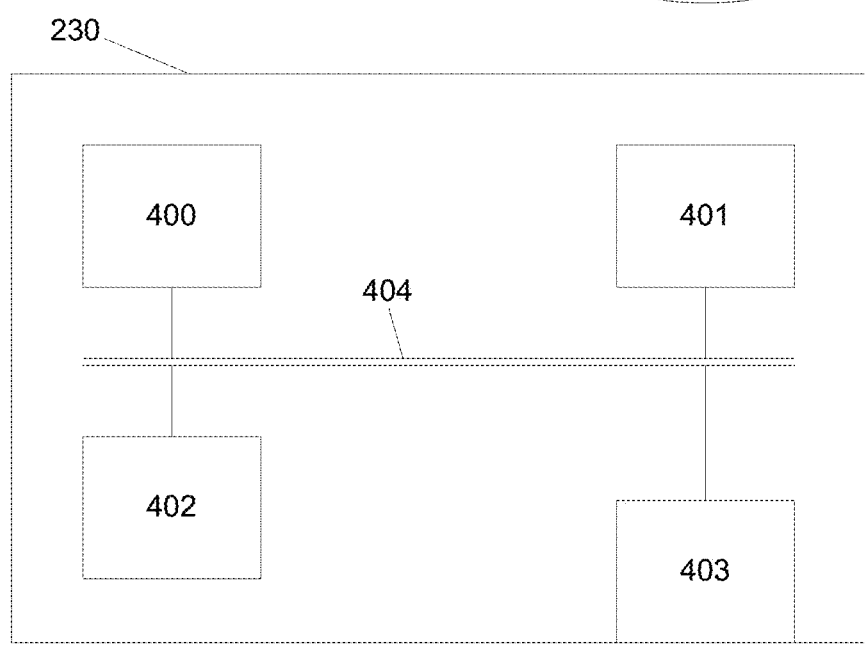
FIG. 4 is a schematic diagram of an example of a client device.

An example of a suitable client device 230 is shown in FIG. 4.

In one example, the client device 230 includes at least one microprocessor 400, a memory 401, an input/output device 402, such as a keyboard and/or display, and an external interface 403, interconnected via a bus 404 as shown. In this example the external interface 403 can be utilised for connecting the client device 230 to peripheral devices, such as the communications networks 240, databases, other storage devices, or the like. Although a single external interface 403 is shown, this is for the purpose of example only, and in practice multiple interfaces using various methods (eg. Ethernet, serial, USB, wireless or the like) may be provided.

In use, the microprocessor 400 executes instructions in the form of applications software stored in the memory 401 to allow communication with the processing system 210, for example to allow asset data to be received.

Accordingly, it will be appreciated that the client devices 230 may be formed from any suitable processing system, such as a suitably programmed PC, Internet terminal, laptop, or hand-held PC, and in one preferred example is either a tablet, or smart phone, or the like. Thus, in one example, the client device 230 is a standard processing system such as an Intel Architecture based processing system, which executes software applications stored on non-volatile (e.g., hard disk) storage, although this is not essential. However, it will also be understood that the client devices 230 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for generating encryption keys and identifiers, and using these in asset tracking, will now be described in further detail. For the purpose of these examples it is assumed that one or more processing systems 210 access asset data based on user inputs provided via the client devices 230, with details of assets being displayed by the client devices 230. In one example, to provide this in a platform agnostic manner, allowing this to be easily accessed using client devices 230 using different operating systems, and having different processing capabilities, input data and commands are received from the client devices 230 using via a webpage, with resulting visualisations being rendered locally by a browser application, or other similar application executed by the client device 230. The processing system 210 is therefore typically a server (and will hereinafter be referred to as a server) which communicates with the client device 230 via a communications network 240, or the like, depending on the particular network infrastructure available.

To achieve this the server 210 typically executes applications software for hosting webpages, as well as performing other required tasks including storing, searching and processing of data, with actions performed by the processing system 210 being performed by the processor 300 in accordance with instructions stored as applications software in the memory 301 and/or input commands received from a user via the I/O device 302, or commands received from the client device 230. It will also be assumed that the user interacts with the server 210 via a GUI (Graphical User Interface), or the like presented on the client device 230, and in one particular example via a browser application that displays webpages hosted by the server 210, or an App that displays data supplied by the server 210. Actions performed by the client device 230 are performed by the processor 400 in accordance with instructions stored as applications software in the memory 401 and/or input commands received from a user via the I/O device 402.

However, it will be appreciated that the above described configuration assumed for the purpose of the following examples is not essential, and numerous other configurations may be used. It will also be appreciated that the partitioning of functionality between the client devices 230, and the server 210 may vary, depending on the particular preferred implementation.

An example of a process for generating encryption keys will now be described in more detail with reference to FIG. 5.

In this example, at step 500, the server 210 receives an indication of a spatial region. In this regard, it is assumed that the spatial region has been previously defined, for example as part of an asset allocation process, an example of which will be defined in more detail below. The indication of the spatial region could be received from the client device 230, for example by having the user input this via a user interface, or retrieving this from a local or remote data store using the client device 230. This is not essential however, and alternatively the spatial region could be retrieved from a data store based on other information provided by the user. For example, the user may have an account established with the server 210, or may have a wallet in which details of spatial regions are stored, in which case details of the spatial region could be retrieved by accessing a stored record.

The spatial region can be identified using a vector defining coordinates of the spatial region within the complex space. It will be appreciated that in some examples, the spatial region may have a fixed predefined size, in which case the vector could be a simple two dimensional vector, and no other information is required. However, in the event that spatial regions have different sizes or depths, then additionally and/or alternatively the spatial region could be identified based on a combination of position and size or depth, for example by having the vector specify an extent or scale of the spatial region, and optionally a depth corresponding to a number of iterations of the complex number formula which are to be used to generate numerical values.

At step 510, a user defined password is received, which is typically a string of alphanumeric characters. This is typically entered via the client device 230, and encrypted prior to transfer to the server, using a session key, SSL connection, or similar. Upon receipt by the server 210, the password is decrypted if required, before being concatenated a number of times at step 520, with the concatenated string being truncated at step 530 to create a truncated string having a set defined length.

At step 540, the server 210 applies each character in the string to a respective angle in an angle array in order to generate a series of geometric translations. The angle array is typically fixed across the system, such that the same angle array is used to generate every encryption key, although it will be appreciated that this is not essential and different angle arrays could be used, in which case a relevant angle array may need to be retrieved. Once the angle array is available, each character in the string is converted to a number based on the ASCII number of the character, with this then being combined with a respective angle in the angle array, to form a vector, with the vector being used together with an origin point within the spatial region to identify specific key locations within the spatial region.

At step 550, the server 210 calculates a numerical value at each of the key locations, typically by performing a set number of iterations of the complex number formula. At step 560, the server 210 generates integer modulo 256 values for each of the numerical values, by discarding any non-integer components of the numerical values and then calculating a modulo 256 value. In one example, this is achieved by a 'flattening' of the fractional value by removing the decimal place.

The server 210 then concatenates resulting numbers in order to generate the encryption key at step 570. The encryption key is typically temporarily stored in volatile random access memory for this to be used as required, for example to encrypt/decrypt an asset data payload, thereby allowing interaction with the asset data. Once the key has been used, this is then discarded, requiring that the key is recreated using the above described process, each time the key is required. At no stage is the key stored in a database or written to any form of persistent memory such as hard disks, only the cipher-block generated by encrypting the payload with the key is stored in a database.

Figure 6:
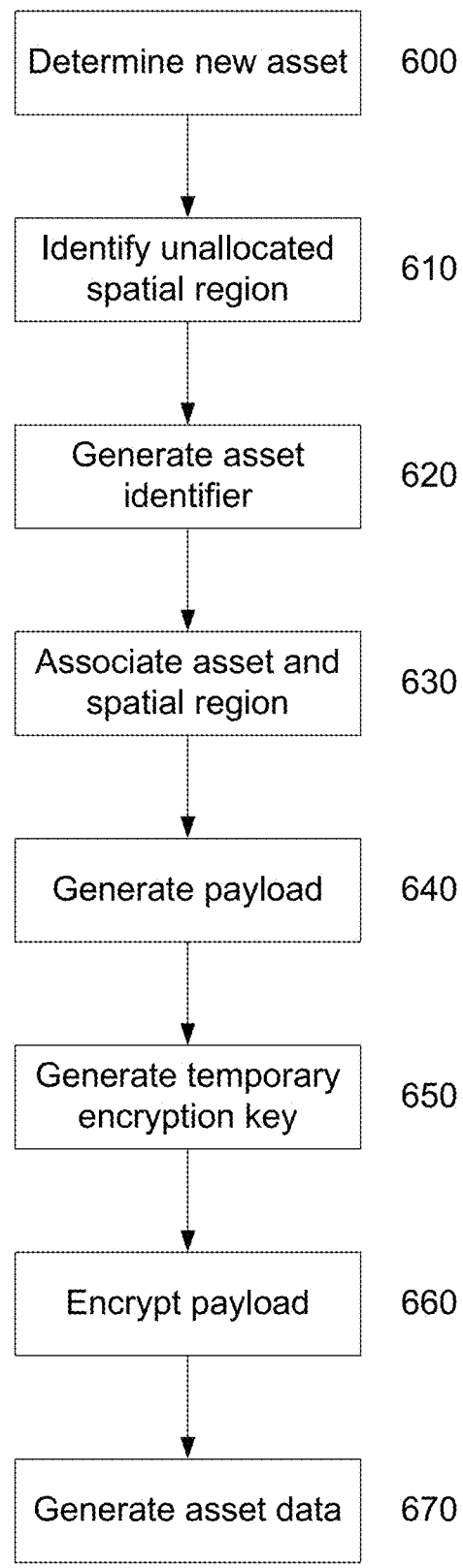
FIG. 6 is a flow chart of a specific example of a process for generating a unique identifier for use in asset tracking.

An example of a process for creating an asset will now be described with reference to FIG. 6.

In this example, at step 600, a new asset is identified by the server 210. This could be achieved in any appropriate manner and could correspond to creating a virtual asset, or identifying a physical asset which is to be tracked. Details of the asset could be provided via a client device 230, or could be generated internally in the case of a virtual asset, and specific examples will be described in more detail below.

At step 610, an unallocated spatial region is identified by the server 210. This is performed in any appropriate manner and could involve a discovery process that analyses the complex space to identify spatial regions that have not previously been allocated to other assets. Typically, this process will also examine a complexity of any identified spatial regions and validate that these are sufficiently complex in order to allow unique identifiers and encryption keys to be created. As the complex space is essentially infinite in size, it will be appreciated that this allows a large number of different spatial regions to be created which meet this criteria.

This process will also typically examine the asset type and properties of the asset, such as an asset value and/or size or volume. Thus, part of the complex space in which the spatial region is found is typically set based on the asset type, so that similar assets are co-located in the complex space. Examples of this is described in more detail below in which parts of the complex space, referred to as bases, are used for different types of assets, so that for example one base could be used for gold, another for silver, etc. It will be appreciated that similarly another base could be used for wallets, another for land titles, or the like. Additionally, a size of the spatial region could be used to represent a property of the asset, such as a size, weight, value or the like.

At step 620, the server 210 generates an asset identifier. The asset identifier is generated by using the approach described above with respect to FIG. 1B, in particular by deriving a 512 bit number sequence from the spatial coordinates and/or size of the spatial region, and optionally taking into account numerical values within the spatial region, using a predetermined approach.

At step 630, the asset and spatial region are associated by having the server 210 create data in an asset definition database, which sets out the location of each spatial region and the asset to which this is being assigned, although as previously indicated, as the identifier can be used to retrieve details of the spatial region, and as the location and size of the spatial region might reflect the nature of the asset, this might not be required in some circumstances.

At step 640, the server 210 generates payload data, for example by creating a graphical representation of the spatial region, a time stamp of the time and/or date of creation of the asset data, together with a digital signature created using a private key of the server 210. Specifically the payload is used to validate the asset data is legitimate by allowing the signature to be decrypted and compared to other data stored in the asset data, such as the unique identifier, wallet identifier, time-stamp or the like.

Figure 5:
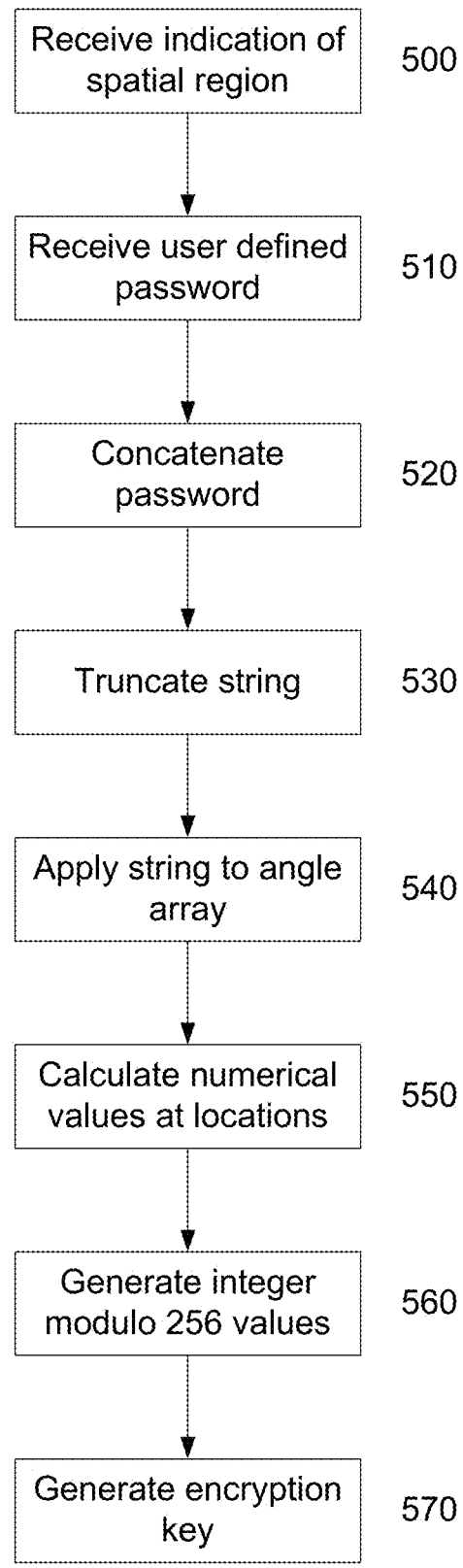
FIG. 5 is a flow chart of a specific example of a process for generating an encryption key.

The server 210 then typically creates a temporary encryption key at step 650, by using a temporary password to generate a key using the technique outlined above with respect to FIG. 5. The temporary key is then used to encrypt the payload at step 660, allowing the asset data to be finalised and stored at step 670, including the cipher-block generated from the encrypted payload. The asset data can then be transferred to individuals, for example by transferring the asset data to a wallet owned by the individual, and separately provided in the individual with the temporary key, allowing the individual to unlock the asset by decrypting the payload with the temporary key and then creating their own key, using their own user defined password.

Figure 7:
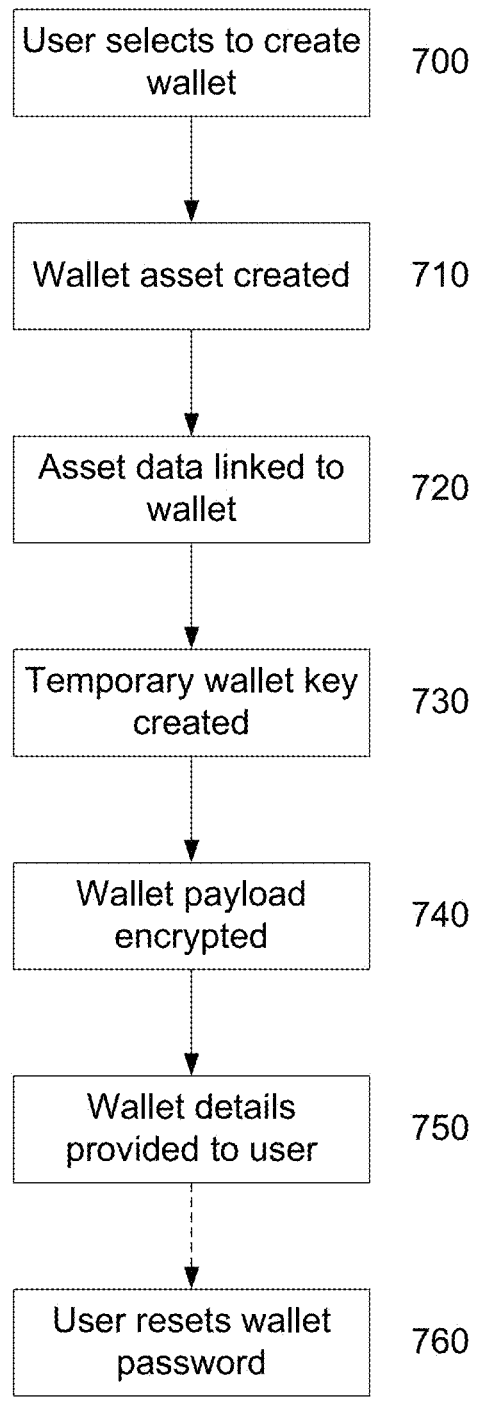
FIG. 7 is a flow chart of an example of a process for creating an asset wallet.

The process of creating a wallet to own assets will now be described in more detail with reference to FIG. 7.

In this example, the user selects to create a wallet using the client device 230, with a wallet asset being created by the server 210 at step 710. As the wallet is in effect an asset, this can be performed utilising the technique described above with respect to FIG. 6, creating a unique wallet identifier that is immutable and stored in the asset database as an asset.

The server 210 can then link asset data to the wallet at step 720, for example corresponding to an asset purchased by the user, by adding the wallet identifier to the asset data stored in the asset database, with a temporary asset key based on a temporary password being created at step 730. The asset payload containing the wallet identifier is encrypted at step 740, with wallet and linked asset details being provided to the user at step 750, via the client device 230. This includes an identification of the spatial region associated with the wallet. The user may then reset the wallet password by entering the wallet password to recreate the wallet encryption key and decrypt the payload data. The user then enters their own password, allowing a new wallet encryption key to be created and used to encrypt the payload.

Figure 8A:
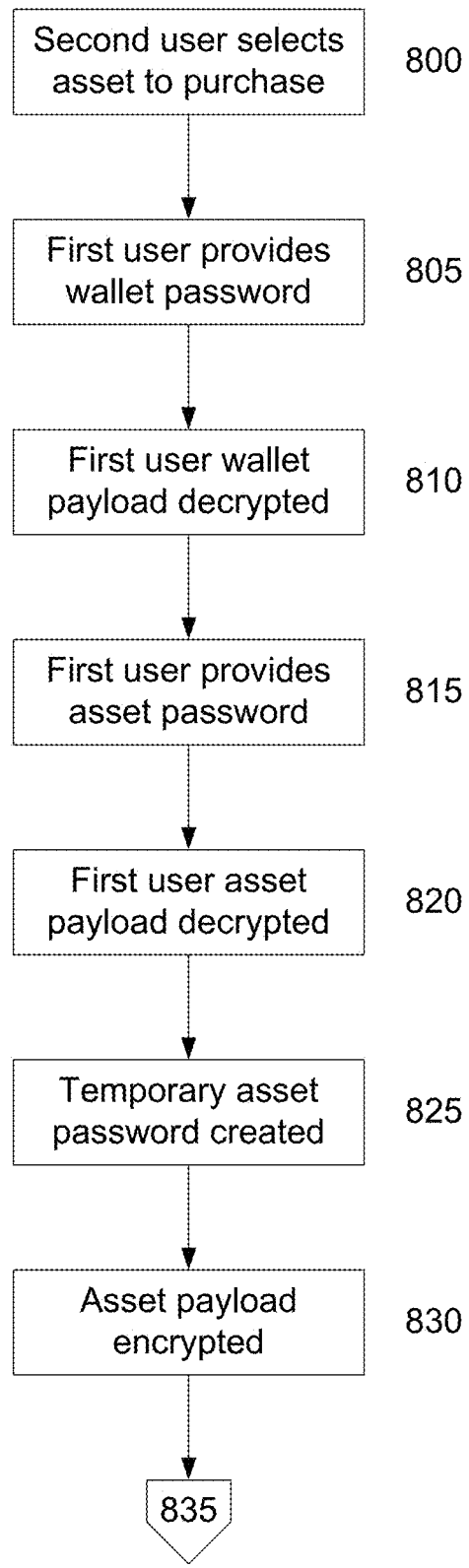
FIGS. 8A to 8C are a flow chart of a specific example of a process used in tracking an asset.
Figure 8B:
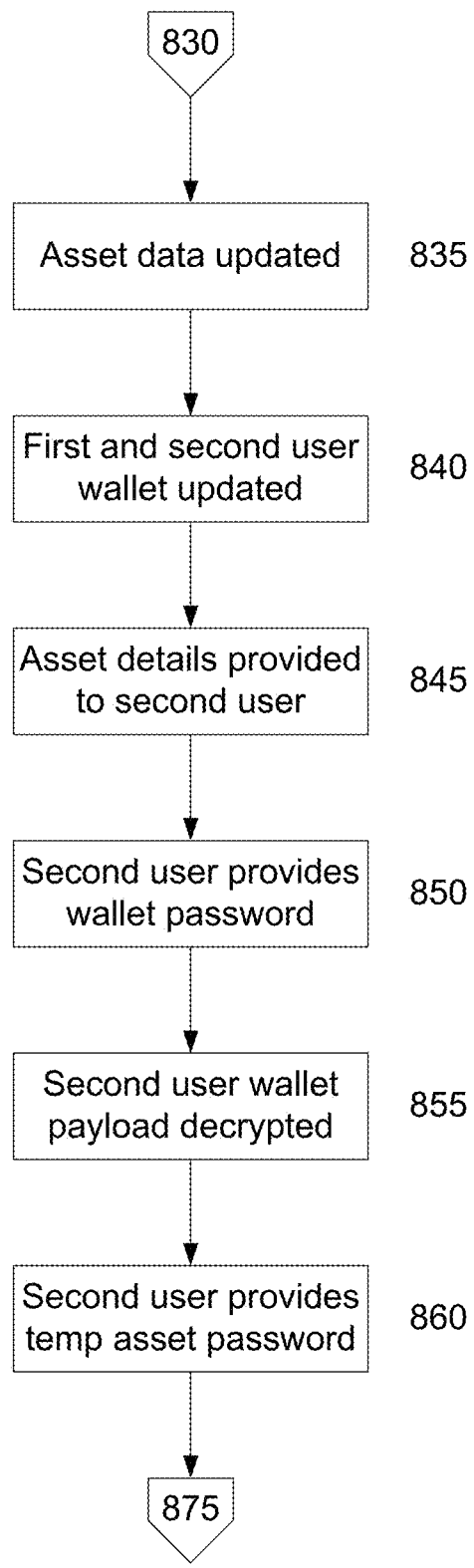
Figure 8C:
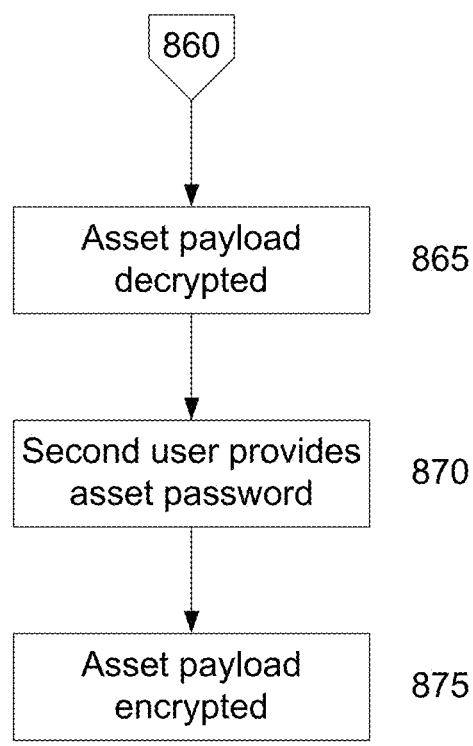

In future when transactions are to be performed, the user is required to enter their wallet password, allowing the wallet payload to be decrypted and the linked asset data retrieved. The asset password can then be used to unlock the asset data, allowing transactions to be performed, and an example of this for transferring an asset from a first user to a second user will now be described with reference to FIGS. 8A to 8C.

In this example, at step 800, a second user selects to purchase an asset from a first user. This could be achieved in any suitable manner and could include an agreement between the parties, which is then notified to the server 210 via a client device 230, or could be achieved by having the server 210 host a market place allowing asset trading to be performed.

At step 805, the first user provides their wallet password via their client device 230, with this being encrypted and transferred to the server 210, allowing the server 210 to generate an encryption key and decrypt the first user's wallet payload at step 810. Details of the wallet payload can then be displayed to the first user via the client device 230, allowing the first user to identify the relevant asset and enter an asset password associated with the asset at step 815. The asset password is encrypted and transferred to the server 210, allowing the server 210 to generate an encryption key and decrypt the asset payload at step 820.

A temporary asset password is created at step 825, with this being used to encrypt the asset payload at step 830. The server 210 updates the asset data with the new encrypted payload now linked to the second user's wallet at step 835.

The server 210 provides asset details to the second user at step 845 by forwarding an indication of the asset and an encrypted version of the temporary password to the second user's client device 230. The second user then provides their own wallet password at step 850, with this being encrypted and transferred via the client device 230 to the server 210, allowing the server 210 to generate a wallet encryption key and decrypt the second user wallet payload at step 855. The second user then provides the temporary asset password at step 860, with this being encrypted and transferred to the server 210, allowing the server 210 to decrypt the asset payload. The second user also enters a new asset password via their client device 230 at step 870, with this being encrypted, transferred to the server 210, allowing the server 210 to generate an asset encryption key allowing the payload to be re-encrypted at step 875, and stored in the wallet.

Accordingly, it will be appreciated that the above described approaches, provide techniques for generating passwords and using passwords in a manner which circumvents the need for password storage. The system can also generate unique identifiers, and in one example, uses these approaches in combination to allow for asset tracking and management processes to be performed. In one preferred approach this involves associating assets with spatial regions in the complex space, with the region being used to derive both an identifier and encryption key for the assets. Assets can then be stored in a wallet, which is itself an asset, allowing assets to be tracked and traded, without requiring key storage.

Encryption Key Techniques

The process of being able to generate and use encryption keys, without a key store, is achieved using the complex plane and related complex functions such as the Mandelbrot or Julia Set in combination with a spatial definition system.

In particular the approach uses a complex recursive function output from a Mandelbrot or other complex number function given an x,y vector with surrounding x,y vector outputs. In this regard, it is important to note that an infinite number of rich highly unique outputs surround every x,y vector in Mandelbrot and Julia sets (and others), although there are some limitations to this as there are regions that go to infinity and complexity goes to zero, but these can be mapped and excluded.

Given these facts, a methodology can be provided to convert a password to a unique but consistent key by reading radial related x,y vectors to a given central x,y vector.

A variety of schemes can be used to implement this, and this can form part of a management system, as long as the schemes are used in a consistent and repeatable manner.

In one example, looking at the binary values of a password can be used to 'pick' a specific surrounding set of x,y vectors to 'read their output' and to pack these outputs to build a key.

For example a database implementing fractal x,y IDs for users can now encrypt passwords without the need of a key store, whilst the password can be easy to remember, meaning it does not need to exist in any form within the database.

Thus, in one example, the complex number plane or space is used in association with complex number functions such as Mandelbrot and Julia Sets to generate consistent and undiscoverable encryption keys.

In one example, such systems implement methods that 'pick' x,y vectors to 'read the output' from surrounding x,y vectors based on passwords or fixed keys, and that then pack the outputs into a new key, which can be used to perform encryption and/or decryption using any suitable encryption algorithm.

It will be appreciated that this leads to a system of key management that does not require a key store and/or does not require the password to be stored in any form, encrypted or plain text.

Unique Identifier Techniques

The above described system can also provide Fixed Asset IDs with embedded context.

Unique IDs are used universally in data systems to facilitate relationships between different data tables and databases. In particular, an ID class known as GUID, a 512 bit number represented by 32 hexadecimal characters, has been used to create universally unique identifiers using well established GUID generation algorithms.

IDs are generally 'content unaware', they purely exist as a unique placeholder and can tell you nothing about their purpose. The current arrangement takes a contrary approach in that it seeks to deliver IDs with a fixed known purpose and where that purpose can be derived and identified by looking at the ID.

Further, this seeks to deliver a standard whereby a vast range of IDs can be defined with absolute known 'asset holding & volume' and where that 'asset holding & volume to ID relationship' is immutable. This property makes an asset identifier recoverable without a database or relationship.

In one example, this can be achieved by combining plane geometry x,y vectors, 'regions' to define class and 'areas' to define 'amount' within the Mandelbrot set, or any other complex function such as the Julia set, to define 'absolute and limited locations' and to integrate the rich numeric space of the complex plane.

The x,y locations/areas are defined by a function designed to consistently define areas within, for example, the Mandelbrot set that include the most complex and variable numeric zones (around 10 iterations or higher) and exclude the zero complexity areas (infinite iterations) using a consistent x and y step value. In the case of a prototype developed to research and refine this approach a step value of 0.01 was used with the Mandelbrot set which yielded 10434 locations, hereinafter referred to 'Bases'.

Figure 9:
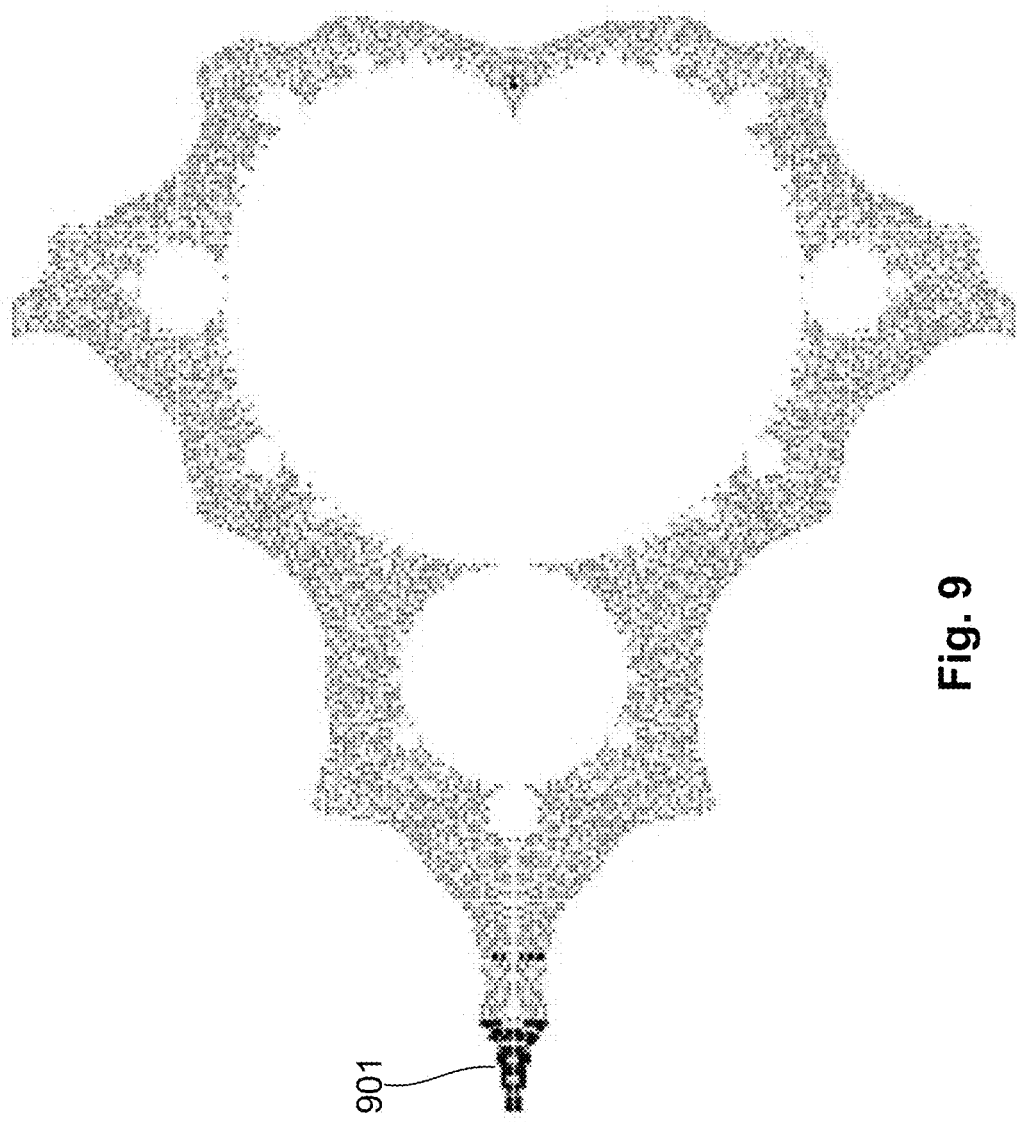
FIG. 9 is a schematic diagram of an example of the Mandelbrot set.

FIG. 9 shows an example plot of a 'Base Map', showing darker regions 901 to which assets have been allocated.

In this particular example, each Base is finite in area (0.01-0.01) but infinitely (within computer maths limits) divisible, with each Base representing 100% of an asset, substance, element, resource, real-estate, currency etc.

The following allocation of assets to Bases, referred to as a "Base mapping" is for the purpose of example only, but is planned to provide flexibility in terms of purpose, which would allow this to act as a standard for asset allocation for a wide range of purposes.

In this instance, the first 118 Bases have been allocated to their corresponding elements from the periodic table (leaving gaps to match Base Number with element number), so that for example, all Gold is mapped to Base 79. This example implements up to 256 Asset Sub Classes for each Base. The first Gold Asset Sub Class has been allocated 'All Gold refined and available above ground' and the second Sub Class 'All below ground Gold'. This arrangement can fit all Gold (or any asset class) into a square 0.01×0.01 with scaling.

Each Asset Class defines the scaling used for that Asset. To Scale the prototype uses a 'Zoom Level' $z1(z)$ that starts at $z1(1)=1$, then $z1(2)=0.1$, $z1(3)=0.01$, $z1(4)=0.001$ etc.

FIG. 12 is an XML snippet defining the Gold Base for the prototype.

Scaling a Million Tons of above ground Gold (the current largest estimate found) this can be defined where each square represents Metric Tons at $z1(6)$ and Grams at $z1(8)$.

In one example, the system can implement a 'No Overlap' rule, meaning that any area can be defined/created at any zoom level as long as there is zero overlap with any other area at any zoom level.

This allows a finite volume of an asset to be defined by an area that can be created at different sizes at different zoom levels. Each zoom level has units that are $\frac{1}{100}$ of the previous zoom level. This can be varied according to the scaling needs of assets.

In one example, the system can be configured to match zoom levels to real world measures used by the corresponding asset so that they precisely match corresponding area ratios.

Using above ground Gold as an example:
Metric Ton=$z1(6)$—one million
Hectogram=$z1(7)$—a Kilo needs 10 of these
Gram=$z1(8)$—an ounce needs 28.3595 of these
Centigram=$z1(9)$ It is possible to split any higher zoom level area into 100 lower zoom level units (10×10), or any other division used by an asset, followed by the removal of the parent split area to maintaining the no-overlap rule.

Once denominations are created in this manner, it is possible to trade/spend/distribute lower denomination amounts of that asset.

The complex number plane is used to limit locations to a specific set within the Mandelbrot Set and the definition of a set of Base Locations using a consistent Mandelbrot filter function. This is a very valuable attribute as this provides 'immutable x,y reference point to purpose relationships' for all areas and IDs derived.

While the area division and zooming described can be applied to any area defined by the number plane, the implementation of this technique of asset/value allocation within the Mandelbrot Set Complex Plane (or another chosen complex function such as the Julia Set) delivers a distinct set of properties and utilities otherwise not available, including:

Limitation within the infinite number plain

Limitation of available bases by a consistent and repeatable complex number function Precise repeatable and immutable locations for these bases derived from the complex number function Location integration with the numerically rich complex number plain In one example, the complex plane integration with area based asset mapping offers a broad range of utility. For example, this approach can be used to create a global standard for asset management, and can be used to create unique immutable asset IDs In one example, the approach can provide an 'absolute ID' that has inherent meaning and represents a fixed amount of the asset.

In one example, the x,y area vectors detailed above yield an infinite range of unique pairs within the defined bases. In practical terms this is limited to computational accuracy. However, research has indicated that a base zoom level of 10 will encompass all considered practical applications. In particular, this yields a potential ID space of one hundred trillion per base, multiplied by 10434 in the case of the above example.

These x,y pairs are immutable and instantly identifiable as to what base and asset they represent. Adding a zoom level dimension, thus creating immutable x,y,z vector, will identify the size of the area and thus the value, area or the volume of the asset represented. These x,y,z vectors can be packed into a single ID using a broad range of techniques.

In one example, the x,y,z vectors are used to generate the unique identifiers, optionally in combination with other information, such as numerical values taken from specific identifier locations within the spatial region. When generating an unique asset identifier in this form, this can directly reveal what asset and what amount by interrogating the ID components and matching them up with the above described base mapping, which in turn can deliver an unique immutable identifier reflecting the content of the spatial region.

Again, while this can be done with any arbitrary x,y,z volume, the integration with the complex plane and complex plane function (eg Mandelbrot Set) delivers an immutable reference point for the x,y,z structure and distinct bases.

Additionally, in one example, this process can be performed to make an asset visible, by way of a visual representation. In this regard, the Mandelbrot and Julia Sets are famous for their ability to render complex and beautiful patterns that you can keep zooming into to find more and more complexity (if you zoom into the most complex areas). The patterns have a similarity but are quite distinct at each location, and hence each square is effectively unique at any zoom level.

Consequently, assets, and in particular the spatial region can be visualised by generating a representation based on the numerical values within the spatial region. In the above example base mapping, asset squares at the zoom levels indicated above initially show relatively smooth graduated areas if not targeted near the 'complex edge'. However, changing the depth of iterations and larger modulus factors in the Mandelbrot function revealed new granularity suitable for visualisation.

Figure 10A:
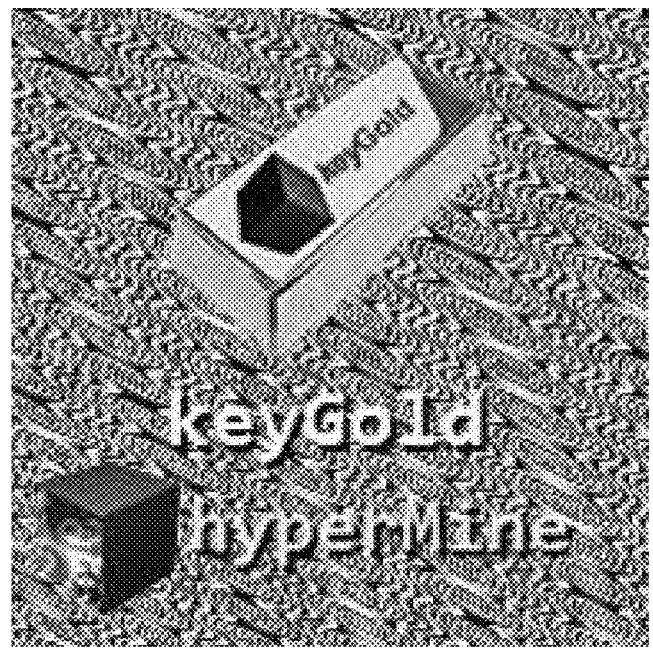
FIG. 10A is a schematic diagram of a first example of an asset spatial region.
Figure 10B:
FIG. 10B is a schematic diagram of a second example of an asset spatial region.

Example representations are shown in FIGS. 10A and 10B, with FIG. 10A showing a fractal seal for the Gold Base, whilst FIG. 10B shows a fractal seal for a Gold Kilo.

Figure 10C:
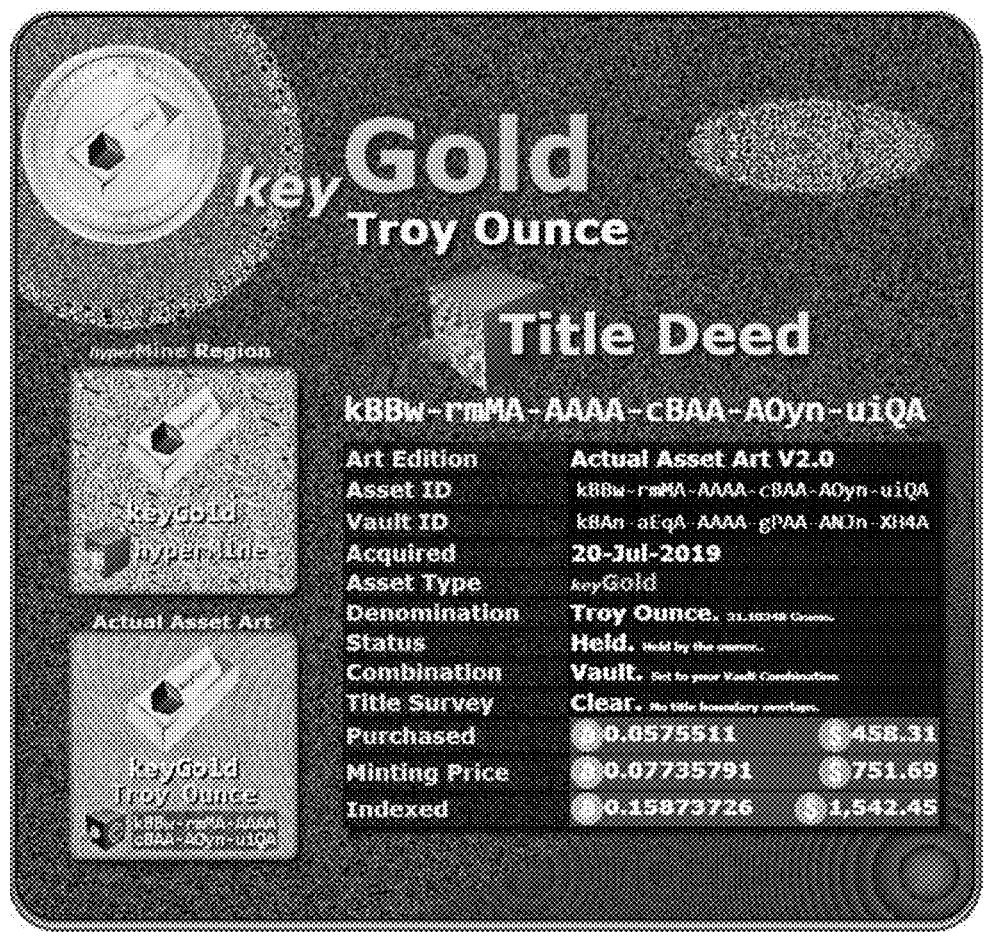
FIG. 10C is a schematic diagram of an example of an asset holding.
Figure 10D:
FIG. 10D is a schematic diagram of an example of a wallet.
Figure 11:
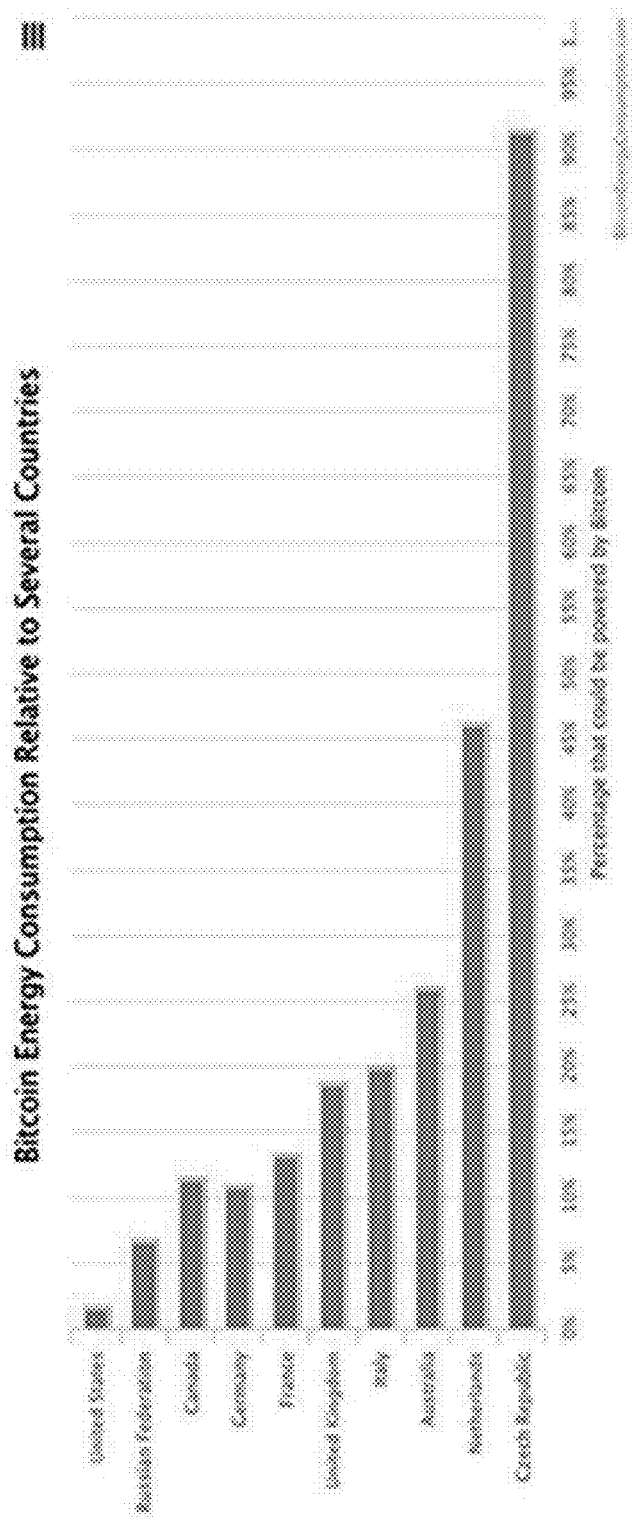
FIG. 11 is a graph illustrating an example of energy consumption in bitcoin mining.

This allows asset spatial regions to be viewed and examined visually, and as each has a unique pattern, these can act as a visual 'Asset Seal', to provide visual confirmation during validation and generally an ability to show a physical representation of the asset an individual is holding. An example of an asset holding is shown in FIG. 10C, with a wallet linked to the asset being shown in FIG. 10D.

In one example, one of the Bases can be provided to act as a Digital Currency. Compared to Bitcoin, which is held as a number at the 'end of a long chain of transactions', this crypto coin is held as a finite resource that can be visualised, without requiring a blockchain to validate it. The ability to render and visualise Assets is a very powerful and desirable attribute.

In one example, the above described system can be used to secure assets. In this regard, assets can be secured using encryption leys generated as described above, allowing the asset to be securely linked to its owner by password, which is in turn used to generate an encryption key.

This provides a mechanism to deliver highly desirable security properties to vectors mapped to the complex plane.

Accordingly, in one example, the above described arrangement can use the complex number plane in association with a complex function such as the Mandelbrot or Julia set and a consistent filter function to define a constant set of area vectors within the chosen complex function for the purpose of generating immutable asset vectors.

In one example, this can be used to provide constant and immutable standard reference for asset ID generation. Furthermore, the system can act to provide a precise scalable and divisible relationship to real world quantities, values, weights and measures according to each defined asset class.

The system can be used to generate unique IDs according to the area vector(s), both for the outer limit of each asset area and all zoom levels within each asset area.

The system can also be used in conjunction with encryption keys generated using a password and locations within the spatial region, to thereby secure asset regions, to provide for asset ownership and management and/or to define and generate securities, crypto currencies, wallets for securities or crypto currencies, or the like. In a similar manner the system can generate Title Deeds that embed unique identifiers and encrypted blocks, generated using an encryption key as described. In another example, the spatial regions can be used to create recoverable database blocks.

Accordingly, it will be appreciated that the above described techniques used in conjunction can provide a single asset tracking mechanism within which all known assets can be defined and scaled according to real-world volumes and values, including real-estate, above and below ground resources such as Gold, Silver, Oil, Gas etc, with these being 'held' in wallets, vaults and 'treasuries', all defined within a single value definition framework that facilitates instant trade and asset transfer.

As previously discussed, each asset has an associated graphical representation of the respective spatial region, which can be used to form an asset representation, such as a title deed. The graphical representation of the respective spatial region has its own original copyright because:
  It is generated from a unique location in fractal space
  Each unique location has a unique detailed art pattern
  Each asset location is located within an asset class region
  Each asset class region is custom positioned and scaled
  Each asset is sized according to its asset class region unit scale
  The system discovers each asset location in a mining process
  The system uses a unique imaging process, using unique settings (such as field/depth of view/resolution/colouring etc) to create a unique representation
  The unique imaging process creates each asset's unique graphical representation
  The system generates the asset ID from the spatial region
  The system performs a platform wide 'free title' check
  The system assembles the asset representation or title deed from:
  The asset's unique graphical representation
  The asset's unique asset identifier
  A system logo
  An asset/unit icon indicative of an asset class
  The system saves the asset representation as an image, such as a JPEG image, whilst securing the asset by allocating the respective spatial region to a user, using the user's password to generate a unique encryption key, and registering the ownership in a database.

It will be appreciated that this results in an important difference compared to other currency systems, such as FIAT currency. Specifically, bank notes and coins are copyrightable, but each bank note and coin of a given denomination all have the same art and hence copyright, whereas asset representations for assets in the current system are based on the graphical representation of individual regions, and hence are unique. Each asset there has its own copyright, allowing this to be physically traded, with trades being recorded in the database through a change of ownership.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system for tracking an asset, the system including one or more processing devices configured to:
   a) identify a spatial region in a complex number space, the spatial region being associated with the asset;
   b) receive a user defined password;
   c) identify a plurality of key locations within the spatial region at least in part using the user defined password;
   d) calculate key numerical values at each of the plurality of key locations using a defined complex number formula; and,
   e) use the key numerical values to generate an encryption key, and wherein the asset is associated with the user by storing an asset record in a database, the asset record being indicative of:
      i) an asset identifier;
      ii) the spatial region; and,
      iii) an encrypted payload derived using the encryption key; and,
   wherein at least one of:
   a) the one or more processing devices are configured to generate a graphical representation of the spatial region, and wherein the graphical representation can be used to identify the spatial region;
   b) at least one of the asset data and the payload are indicative of at least one of:
      i) a spatial region location;
      ii) a spatial region extent;
      iii) a graphical representation of the spatial region;
      iv) a time stamp;
      v) an asset location;
      vi) an asset identity;
      vii) an asset value;
      viii) at least one asset owner;
      ix) a digital signature; and,
      x) a wallet identifier;
   c) the spatial region includes at least one of:
      xi) a spatial area; and,
      xii) a spatial volume;
   d) the spatial region is identified using at least one of:
      xiii) a vector indicative of a location of the spatial region in the complex space; and,
      xiv) a parameter indicative of an extent of the spatial region;
   e) the complex formula is at least one of:
      xv) a Julia set;
      xvi) a Mandelbrot set;
      xvii) a complex number set; and,
      xviii) a chaotic formula using two seed values;
   f) the spatial region is provided in a part of complex space where the complex formula has non-infinite values and complexity is non-zero;
   g) the one or more processing devices are configured to generate an asset representation, the asset representation including at least a graphical representation of the spatial region and optionally at least one of:
      xix) the asset representation is indicative of at least one of:
         (1) the spatial region;
         (2) the asset identifier;
         (3) an asset class;
         (4) an asset value;
         (5) an asset size; and,
         (6) an asset quantity;
      xx) at least one of the asset representation and the graphical representation is subject to copyright;
      xxi) the asset representation is tradable.

2. A system according to claim 1, wherein the one or more processing devices are configured to identify the plurality of key locations using a sequence of geometric translations based on the user defined password.

3. A system according to claim 2, wherein the one or more processing devices are configured to determine the sequence of geometric translations using fixed translations modified using the user password, and wherein the fixed translations are optionally at least one of:
   a) predefined;
   b) generated for each asset; and,
   c) unique to each asset.

4. A system according to claim 3, wherein the one or more processing devices are configured to:
   a) concatenate the repeated versions of the password to generate a character string of a defined length, optionally by:
      i) concatenating the repeated versions of the password to generate a character string; and,
      ii) truncating the character string at the defined length; and,
   b) apply each character in the character string to a respective fixed translation to generate the sequence of geometric translations.

5. A system according to claim 4, wherein the fixed translations are angles and wherein the one or more processing devices are configured to:
   a) define lengths using the characters, optionally using ASCII values of each character; and,
   b) generate geometric translations in the form of translation vectors using the angles, wherein optionally the angles represent a rotation angle about a key origin location in the spatial region and the lengths represent a distance from the key origin location, and wherein the key origin location is at least one of:
      i) a central location within the spatial region;
      ii) a corner of the spatial region;
      iii) offset from a central location within the spatial region; and,
      iv) offset from a corner of the spatial region.

6. A system according to claim 3, wherein the one or more processing devices are configured to generate fixed translations for each asset by:
   a) selecting a seed location within the spatial region, wherein the seed location is optionally at least one of:
      i) a key origin location;
      ii) a central location within the spatial region;
      iii) a corner of the spatial region;
      iv) offset from a central location within the spatial region; and,
      v) offset from a corner of the spatial region;
   b) calculating a seed numerical value at the seed location using the defined complex number formula; and,
   c) using the seed numerical value to seed a number generator to thereby create a plurality of generated values, the fixed translations being derived from the plurality of generated values, wherein the number generator is optionally a random number generator, and wherein the plurality of generated values are identical for a given seed numerical value.

7. A system according to claim 1, wherein the one or more processing devices are configured to generate the numerical value at each key location by:
 a) using an iteration of the complex number formula;
 b) generating an integer value from the result of the complex number formula iteration; and,
 c) calculating a modulus 256 number from the integer value.

8. A system according to claim 1, wherein the one or more processing devices are configured to:
 a) identify a first plurality of key locations within the spatial region using a sequence of geometric translations calculated using first fixed translations modified using the user defined password;
 b) identify a second plurality of key locations within the spatial region using a sequence of geometric translations calculated using second fixed translations modified using the user defined password;
 c) calculate key numerical values at each of the first and second plurality of key locations; and,
 d) use the key numerical values to define an encryption key.

9. A system according to claim 1, wherein the one or more processing devices are configured to:
 a) identify an unallocated spatial region in the complex number space, optionally by:
  i) determining an asset type; and,
  ii) selecting the unallocated spatial region in accordance with the asset type; and,
 b) allocate the unallocated spatial region to the asset to associate the spatial region with the asset and wherein the one or more processing devices are optionally configured to determine an extent or depth of the spatial region based on at least one of:
  i) a property of the asset;
  ii) a value of an asset; and,
  iii) a quantity of an asset.

10. A system according to claim 1, wherein the one or more processing devices are configured to:
 a) generate a unique asset identifier; and,
 b) generate asset data using the unique asset identifier.

11. A system according to claim 10, wherein the one or more processing devices are configured to at least one of:
 a) associate the spatial region with the asset by recording an association between the unique asset identifier and the asset;
 b) calculate the asset identifier using at least one of:
  i) coordinates of the spatial region in the complex space; and,
  ii) an extent of the spatial region in the complex space; and,
 c) calculate identifier numerical values associated with the spatial region using a defined complex number formula and generate a unique asset identifier using the identifier numerical values.

12. A system according to claim 1, wherein the one or more processing devices are configured to:
 a) generate a digital signature; and,
 b) generate the asset data using the digital signature.

13. A system according to claim 12, wherein the one or more processing devices are configured to generate the digital signature using at least one of:
 a) a private key of a private/public key pair to allow the digital signature to be verified,
 b) using the unique asset identifier.

14. A system according to claim 1, wherein the one or more processing devices are configured to transfer an asset from a first user to a second user by:
 a) receiving a first user defined password from the first user;
 b) using the first user defined password to generate a first encryption key;
 c) decrypting the payload using the first encryption key to generate a decrypted payload;
 d) updating the payload to link to the second users wallet;
 e) receiving a second user defined password from the second user;
 f) using the second user defined password to generate a second encryption key;
 g) encrypting the decrypted payload using the second encryption key to generate the new payload; and
 h) updating the asset data using the new payload and wherein the one or more processing devices are optionally configured to transfer an asset from a first user to a second user by:
  i) generating a temporary password;
  ii) use the temporary password to generate a temporary encryption key;
  iii) encrypt the decrypted payload using the temporary encryption key to generate the new payload;
  iv) update the asset data using the new payload;
  v) notify the second user of the temporary password;
  vi) receiving the temporary password from the second user;
  vii) using the temporary password to generate the temporary encryption key;
  viii) decrypting the payload using the temporary encryption key to generate a decrypted payload;
  ix) receiving a second user defined password from the second user;
  x) using the second user defined password to generate a second encryption key;
  xi) encrypting the decrypted payload using the second encryption key to generate the new payload; and
  xii) updating the asset data using the new payload.

15. A system according to claim 1, wherein the database includes a number of wallets associated with respective users, and wherein at least one of:
 a) an asset is associated with an asset owner by storing the asset data in the wallet of the respective asset owner; and,
 b) an asset is associated with an asset owner by linking the asset data to the wallet of the respective asset owner.

16. A system according to claim 1, wherein the system is configured to track assets in multiple asset classes, and wherein:
 a) each asset class is assigned to a respective asset region in the complex number space; and,
 b) each asset within an asset class is associated with a spatial region that is a part of the asset region associated with the asset class and wherein a size of the spatial region is optionally based on at least one of:
  i) a value of the asset;
  ii) a quantity of the asset; and,
  iii) a size of the asset.

17. A method for tracking an asset, the method including, in one or more processing devices:
 a) identifying a spatial region in a complex number space, the spatial region being associated with the asset;

b) receiving a user defined password;
c) identifying a plurality of key locations within the spatial region at least in part using the user defined password;
d) calculating key numerical values at each of the plurality of key locations using a defined complex number formula; and,
e) using the key numerical values to generate an encryption key, and wherein the asset is associated with the user by storing an asset record in a database, the asset record being indicative of:
   i) an asset identifier;
   ii) the spatial region; and,
   iii) an encrypted payload derived using the encryption key; and
wherein at least one of:
a) the one or more processing devices are configured to generate a graphical representation of the spatial region, and wherein the graphical representation can be used to identify the spatial region;
b) at least one of the asset data and the payload are indicative of at least one of:
   i) a spatial region location;
   ii) a spatial region extent;
   iii) a graphical representation of the spatial region;
   iv) a time stamp;
   v) an asset location;
   vi) an asset identity;
   vii) an asset value;
   viii) at least one asset owner;
   ix) a digital signature; and,
   x) a wallet identifier;
c) the spatial region includes at least one of:
   xi) a spatial area; and,
   xii) a spatial volume;
d) the spatial region is identified using at least one of:
   xiii) a vector indicative of a location of the spatial region in the complex space; and,
   xiv) a parameter indicative of an extent of the spatial region;
5) the complex formula is at least one of:
   xv) a Julia set;
   xvi) a Mandelbrot set;
   xvii) a complex number set; and,
   xviii) a chaotic formula using two seed values;
e) the spatial region is provided in a part of complex space where the complex formula has non-infinite values and complexity is non-zero;
f) the one or more processing devices are configured to generate an asset representation, the asset representation including at least a graphical representation of the spatial region and optionally at least one of:
   xix) the asset representation is indicative of at least one of:
      (1) the spatial region;
      (2) the asset identifier;
      (3) an asset class;
      (4) an asset value;
      (5) an asset size; and,
      (6) an asset quantity;
   xx) at least one of the asset representation and the graphical representation is subject to copyright;
   xxi) the asset representation is tradable.

18. A system for generating an encryption key, the system including one or more processing devices configured to:
a) identify a spatial region in a complex number space;
b) receive a user defined password;
c) identify a plurality of key locations within the spatial region at least in part using the user defined password;
d) calculate key numerical values at each of the plurality of key locations using a defined complex number formula; and,
e) use the key numerical values to generate an encryption key; and
wherein at least one of:
a) the one or more processing devices are configured to generate a graphical representation of the spatial region, and wherein the graphical representation can be used to identify the spatial region;
b) at least one of the asset data and the payload are indicative of at least one of:
   i) a spatial region location;
   ii) a spatial region extent;
   iii) a graphical representation of the spatial region;
   iv) a time stamp;
   v) an asset location;
   vi) an asset identity;
   vii) an asset value;
   viii) at least one asset owner;
   ix) a digital signature; and,
   x) a wallet identifier;
c) the spatial region includes at least one of:
   xi) a spatial area; and,
   xii) a spatial volume;
d) the spatial region is identified using at least one of:
   xiii) a vector indicative of a location of the spatial region in the complex space; and,
   xiv) a parameter indicative of an extent of the spatial region;
5) the complex formula is at least one of:
   xv) a Julia set;
   xvi) a Mandelbrot set;
   xvii) a complex number set; and,
   xviii) a chaotic formula using two seed values;
e) the spatial region is provided in a part of complex space where the complex formula has non-infinite values and complexity is non-zero;
f) the one or more processing devices are configured to generate an asset representation, the asset representation including at least a graphical representation of the spatial region and optionally at least one of:
   xix) the asset representation is indicative of at least one of:
      (1) the spatial region;
      (2) the asset identifier;
      (3) an asset class;
      (4) an asset value;
      (5) an asset size; and,
      (6) an asset quantity;
   xx) at least one of the asset representation and the graphical representation is subject to copyright;
   xxi) the asset representation is tradable.

19. A system for generating a unique identifier, the system including one or more processing devices configured to:
a) identify a spatial region in a complex number space;
b) determine identifier numerical values associated with the spatial region;
c) generate a unique identifier using the identifier numerical values; and
wherein at least one of:
a) the one or more processing devices are configured to generate a graphical representation of the spatial region, and wherein the graphical representation can be used to identify the spatial region;

b) at least one of the asset data and the payload are indicative of at least one of:
i) a spatial region location;
ii) a spatial region extent;
iii) a graphical representation of the spatial region;
iv) a time stamp;
v) an asset location;
vi) an asset identity;
vii) an asset value;
viii) at least one asset owner;
ix) a digital signature; and,
x) a wallet identifier;
c) the spatial region includes at least one of:
xi) a spatial area; and,
xii) a spatial volume;
d) the spatial region is identified using at least one of:
xiii) a vector indicative of a location of the spatial region in the complex space; and,
xiv) a parameter indicative of an extent of the spatial region;
5) the complex formula is at least one of:
xv) a Julia set;
xvi) a Mandelbrot set;
xvii) a complex number set; and,
xviii) a chaotic formula using two seed values;
e) the spatial region is provided in a part of complex space where the complex formula has non-infinite values and complexity is non-zero;
f) the one or more processing devices are configured to generate an asset representation, the asset representation including at least a graphical representation of the spatial region and optionally at least one of:
xix) the asset representation is indicative of at least one of:
(1) the spatial region;
(2) the asset identifier;
(3) an asset class;
(4) an asset value;
(5) an asset size; and,
(6) an asset quantity;
xx) at least one of the asset representation and the graphical representation is subject to copyright;
xxi) the asset representation is tradable.

* * * * *